(12) United States Patent
Liu et al.

(10) Patent No.: US 12,141,436 B1
(45) Date of Patent: Nov. 12, 2024

(54) SAS DRIVER-LEVEL SYSTEMS AND METHODS FOR UPGRADING FIRMWARE FOR DISK ARRAY ENCLOSURES (DAES)

(71) Applicant: Dell Products L.P., Round Rock, TX (US)

(72) Inventors: Bing Liu, Tianjin (CN); Joel Miller, Vacaville, CA (US); Deepu M Sreedhar, Calicut (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/322,510

(22) Filed: May 23, 2023

(51) Int. Cl.
  *G06F 3/06* (2006.01)
(52) U.S. Cl.
  CPC .......... *G06F 3/0607* (2013.01); *G06F 3/0658* (2013.01); *G06F 3/0689* (2013.01)
(58) Field of Classification Search
  None
  See application file for complete search history.

(56) References Cited

U.S. PATENT DOCUMENTS 11,231,858 B2 * 1/2022 Davis ............... G06F 13/42

* cited by examiner

*Primary Examiner* — Charles J Choi
(74) *Attorney, Agent, or Firm* — Staniford Tomita LLP

(57) ABSTRACT

A request is received to upgrade firmware for disk array enclosures (DAEs). Each DAE is reachable by a host server using first and second paths. The first path extends from a first port of a first HBA of the host server to each of a set of first input/output modules (IOMs) in the DAEs. The first IOMs have first SAS expanders to which storage disks are connected. The second path extends from a second port of a second HBA of the host server to each of a set of second IOMs in the DAEs. The second IOMs have second SAS expanders to which the disks are connected. The first port is changed from a first state during which a SAS driver exposes all topology change events to an OS of the host server to a second state during which the SAS driver does not expose all of the topology change events.

18 Claims, 13 Drawing Sheets

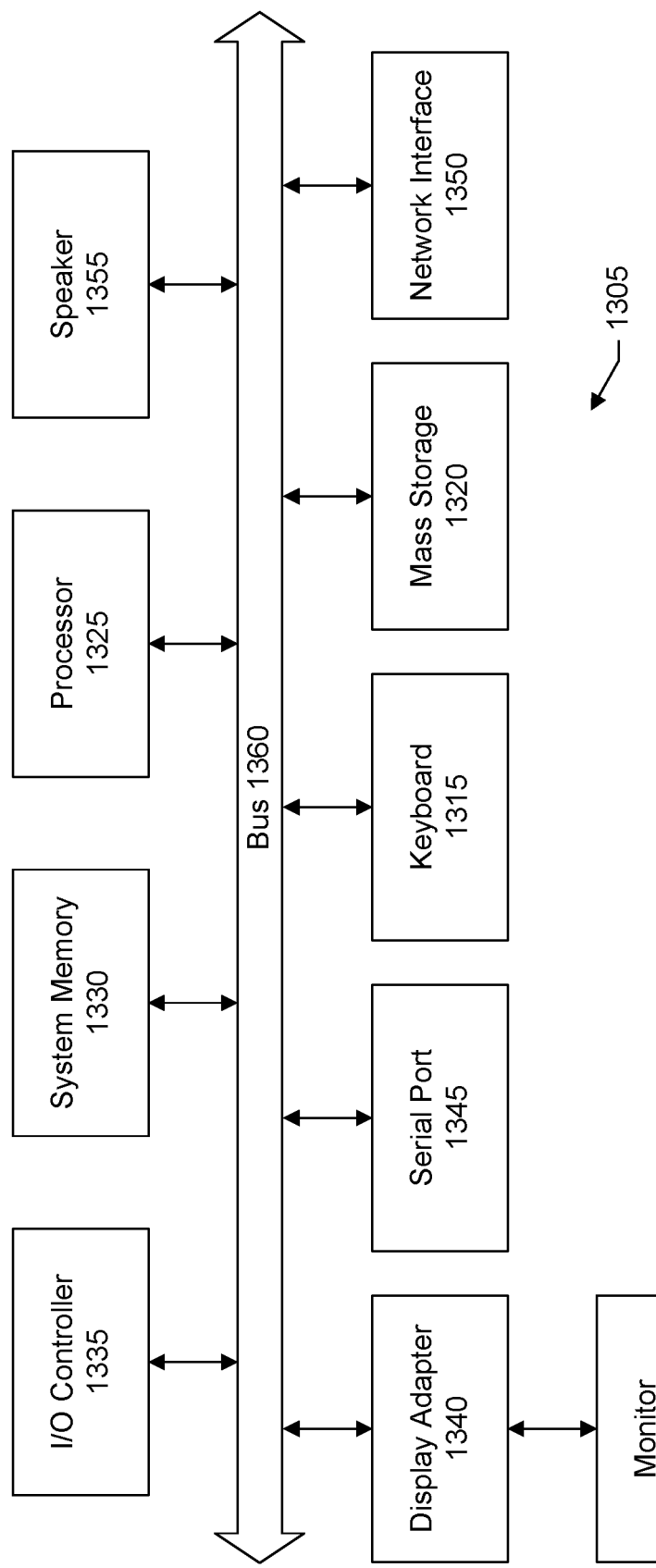

SAS DRIVER-LEVEL SYSTEMS AND METHODS FOR UPGRADING FIRMWARE FOR DISK ARRAY ENCLOSURES (DAES)

CROSS-REFERENCE TO RELATED APPLICATIONS

This application is related to co-pending U.S. patent application Ser. No. 18/321,489, filed May 22, 2023; and Ser. No. 18/322,522, filed May 23, 2023, filed concurrently herewith, and which are incorporated herein by reference for all purposes.

TECHNICAL FIELD

The present invention relates generally to the field of information management, and, more particularly, to upgrading firmware for disk array enclosures.

BACKGROUND

Firmware is a type of software that is embedded in electronic devices and computer components. It provides low-level control over the device's hardware and is responsible for managing the device's operation. Firmware is typically stored in non-volatile memory, such as ROM, EPROM, or flash memory, which means that it remains intact even when the device is powered off. Firmware can be updated or upgraded, and it is often necessary to do so to fix bugs, improve performance, or add new features to the device.

One type of device within which firmware may be found is a disk array enclosure (DAE). Disk array enclosures allow an organization to expand their storage capacity. A DAE is a type of storage device having a set of disks, controller, power supply, and other components. The disks can be arranged and presented as one or more logical units. The organization's storage architecture may thus include a server connected to a set of DAEs.

The process of a firmware upgrade generally involves the device restarting multiple times throughout the upgrade process. These restarts are a normal part of the process and are necessary to help ensure that any changes made to the firmware have been properly applied and that the device is running correctly. Services monitoring the DAEs, including the DAEs themselves, may generate and advertise notifications associated with the restarts so that other services dependent on the DAEs are aware of the status. A large-scale storage system may have multiple DAEs with each DAE having many dozens of disks or drives. The restarting of the DAEs during a firmware upgrade thus results in a flood of notifications that can quickly overwhelm other services as they attempt to process each notification. In many cases, the result is a severe degradation in performance of the overall system and even DAEs not being recognized after a firmware upgrade.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 13 shows a block diagram of a computer system suitable for use with the information processing system, according to one or more embodiments.

DETAILED DESCRIPTION

Figure 1:
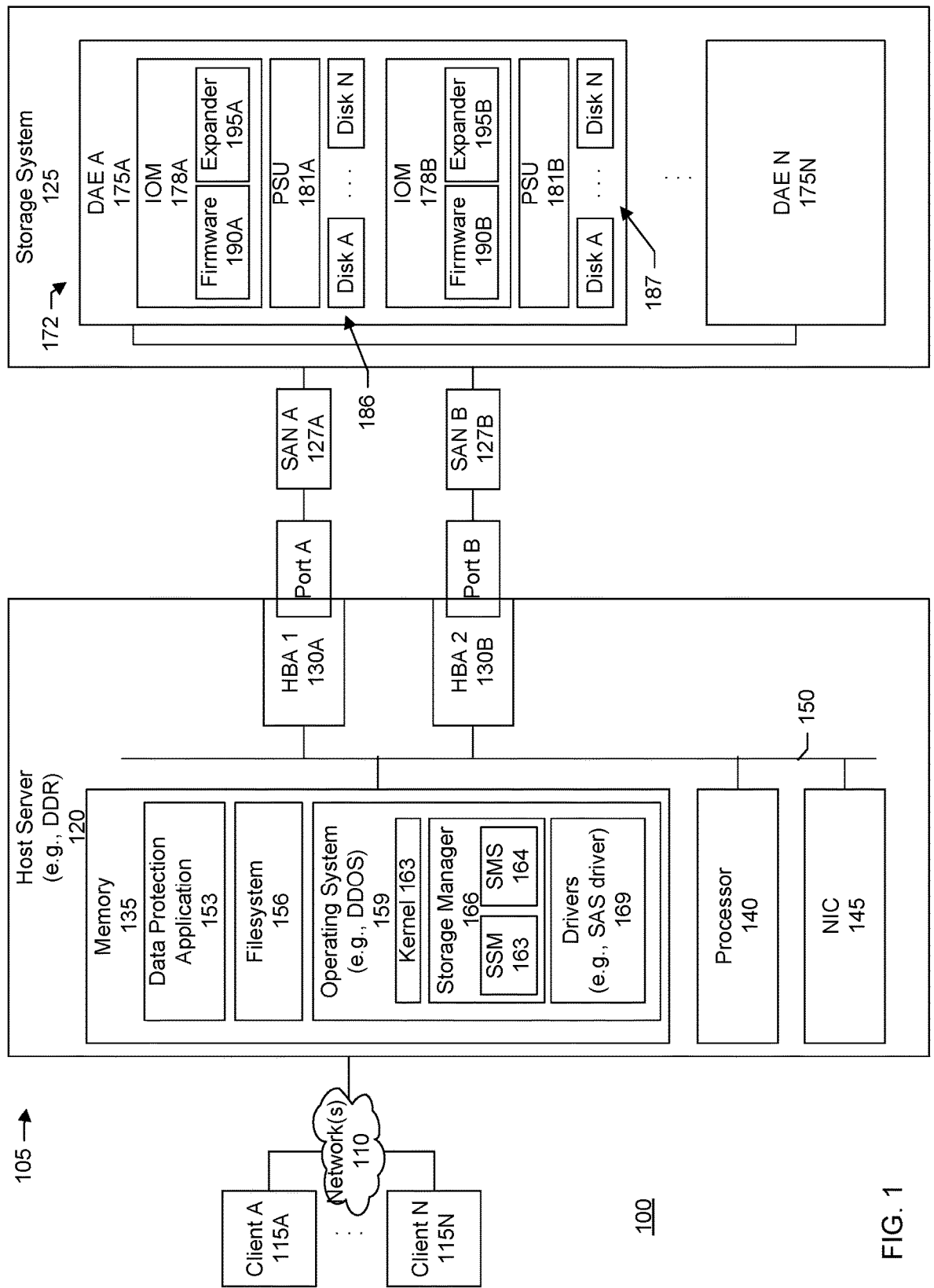
FIG. 1 shows a block diagram of an information handling system for managing firmware upgrades for DAEs in accordance with one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. The variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

FIG. 1 shows a block diagram of an information handling system 100 within which upgrading firmware of a set of disk array enclosures (DAEs) may be implemented. In an embodiment, the system includes a data protection backup system 105. A network 110 connects any number of clients 115A-N to the data protection backup system. The data protection system provides a secondary storage system for data (e.g., files) generated by the clients. Files stored on primary storage of the clients may be periodically backed up to the data protection system. Backup files and other data stored in secondary storage may be stored in a format that is different from a native format of the primary file copies at the clients. For example, backups may be stored in a compressed format, deduplicated format, or both.

The clients may include servers, desktop computers, laptops, tablets, smartphones, internet of things (IoT) devices, or combinations of these. The data protection backup storage system receives requests from the clients, performs processing required to satisfy the requests, and forwards the results corresponding to the requests back to the requesting client system. The processing required to satisfy the request may be performed by the data protection storage appliance or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

In a specific embodiment, the data protection backup system is a deduplication-based data protection system. The system provides backup, restore, retrieval, and archive operations. An example of a deduplication-based backup system is Data Domain as provided by Dell Technologies of Round Rock, Texas. While some embodiments are described in conjunction with a backup system referred to as Data Domain, it should be appreciated that aspects and principles of the systems and techniques described herein can be applied to other backup or data protection systems provided by other vendors.

The data protection system includes a host server 120 connected to a backup storage system 125. An example of a host server is a Data Domain Restorer (DDR) as provided by Dell Technologies. The host server may be referred to as a backup server. The connection may be via a local area network (LAN) or one or more storage area networks (SANS) 127A,B as shown in the example of FIG. 1. Each SAN is associated with a host bus adaptor (HBA). In the example shown in FIG. 1, the host server includes first and second HBAs 130A,B, respectively, along with other hardware components including memory 135, processor 140, network interface controller (NIC) 145, and so forth, each of which may be interconnected via a bus 150 or other interconnection architecture.

Memory of the host server may include a data protection application 153, filesystem 156, and operating system 159. The data protection application is responsible for handling data protection operations requested by the clients such as backups and restorations.

The filesystem organizes the files and other data stored in the storage system and presents that data in a logical format to the clients and applications. In a specific embodiment, the filesystem is a deduplicated filesystem. In a deduplication-based system, data such as files to be backed up are divided into a set of segments. The segments are hashed to generate a set of fingerprints. These fingerprints uniquely identify the segments. The data protection system maintains metadata separate from the actual client data being backed up. The metadata includes a collection of fingerprints corresponding to data segments that already exist on the backup storage system. If the fingerprint of a data segment from a file to be backed up does not match an existing fingerprint, the data segment is written to the physical disk storage of the storage system and the fingerprint is added to the collection of existing fingerprints. If, however, the fingerprint matches an existing fingerprint, the data segment is determined to be a duplicate and is not written to the storage system. Instead, a reference is generated that points to the already existing data segment on backup storage that corresponds to the fingerprint. The reference is stored as metadata by the data protection backup system so that the file can be reconstructed or reassembled as part of a restore operation.

The operating system (OS) is responsible for managing hardware resources of the host server. An example of an operating system is a Data Domain Operating System (DDOS) as provided by Dell Technologies. Components of the operating system may include a kernel 163, storage manager 166, and drivers 169. The kernel is responsible for managing system resources such as memory, CPU time, and input/output operations. The kernel communicates with hardware devices and provides a layer of abstraction between the hardware and the software (e.g., data protection application) running on the host server. The kernel includes a set of services and interfaces that allow software applications to access the system resources in a controlled and secure manner.

The storage manager is an operating system-level component that includes a storage subsystem manager (SSM) 163 and system management service (SMS) 164. The storage subsystem manager is a low-level process which monitors the storage disks, enclosures, topology, host bus adaptors, and other low-level components. The system management service provides the interface to interconnect different modules of the host server. SMS is responsible for handling storage configuration changes.

The SANs provide access to a set of shared storage devices 172 of the storage system. In particular, the host bus adaptors of the host server connect the host server to the storage devices of the backup storage system. The host bus adaptors provide input/output (I/O) processing and physical connectivity between the server and storage devices for transferring data between the host server and storage devices. In a specific embodiment, the storage devices include a set of disk array enclosures (DAEs) 175A-N. The DAEs are arranged to form a serial attached SCSI (SAS) domain. SAS is a point-to-point serial protocol that moves data to and from computer-storage devices such as hard drives and tape drives. In an embodiment, the host server connects to the storage system via a SAS connection. The storage system may include any number of DAEs.

The drivers are software components that allow the operating system to communicate with the hardware devices, such as a printer, network adapter, or storage device. Generally, every hardware device requires a specific driver to be installed on the OS in order to function properly. When the OS wants to communicate with a device, it sends requests to the driver, which translates the requests into commands that the device can understand. The driver then sends the commands to the device and receives responses back, which it passes back to the OS. For example, a printer driver allows the OS to send print jobs to the printer, while a network adapter driver enables the OS to communicate with other devices on a network.

More particularly, the OS may create or use a device file that represents a device in the filesystem. When the OS needs to access, the device, the OS uses the device file to communicate with the device driver. When a device driver is loaded, it registers itself with the operating system's device management subsystem. The device management subsystem then creates a device file for the hardware device which allows the operating system to access the device. The device file may be created in the /dev directory, and its name is typically based on the type of the device, such as "sda" for a hard drive, "ttyS0" for a serial port, or "lp0" for a parallel port. The device file is used by the operating system to communicate with the device driver and ultimately the hardware device.

An example of a driver is a serial attached small computer system interface (SCSI) driver or SAS driver. SCSI provides a set of standards for connecting and transferring data between computers and peripheral devices. A SCSI command is the basic unit of communication in a SCSI storage system. The SCSI Primary Command Set defines and maintains a set of standard SCSI commands. SAS provides an interface to connect external storage disks to a host server via a high speed interconnect.

A DAE houses multiple individual storage disks such as hard drives (HDDs) or solid state drives (SSDs) in a single enclosure. The storage disks may be arranged into an array. As shown in the example of FIG. 1, a DAE may include multiple input/output module (IOMs) 178A,B, each with corresponding power supply units (PSU) 181A,B, sets of storage disks 186, 187, controller, cooling unit, and so forth. The IOMs include firmware 190A,B and expanders 195A.B. The IOMs handle the communication between the storage disks and external devices, such as servers or storage area networks (SANs). The expanders manage the flow of data between the storage disks and the IOMs.

In a specific embodiment, the DAEs are configured into Redundant Array of Independent Disks (RAID) groups. RAID is a data storage virtualization technology that combines multiple physical disk drive components into one or more logical units for the purposes of data redundancy, performance improvement, or both. A RAID group may include multiple disks from a single DAE or multiple disks from multiple DAEs organized into a single logical unit. Data may be distributed or "striped" across the disks of a RAID group.

A customer of the backup system can increase the data storage capacity of the backup system by purchasing additional DAEs. A DAE may be provided by a third party vendor, i.e., a vendor different from a vendor of the backup host server. The host server, via the HBAs, allow for connecting to multiple interconnected DAEs.

Multiple storage disks may be connected to a single port on an IOM. The storage disks provide the storage space for files and other data (e.g., backup data). The power supply unit provides the power to the internal components of the DAE including, for example, the storage disks, IOMs, and expanders. The controller is responsible for managing disk operations and coordinating data transfer among the IOMs, expanders, and storage disks.

Firmware is a type of software that is embedded in a hardware device such as the DAE and provides low-level control over the components. Firmware may be written to a hardware device's non-volatile memory. Non-volatile memory is a form of static random access memory where the content is saved when a hardware device is turned off or loses its external power source. Firmware typically provides a set of instructions that enable the device to perform specific functions, such as booting up, communicating with other devices, and managing power consumption. Firmware is considered to sit at a level lower than software such as application programs or even operating system. Firmware of the DAE may include an implementation of the SAS Management Protocol (SMP) and SCSI Enclosure Services (SES) protocol. SMP allows management and communication with the storage disks and other components in the enclosure. The SES protocol allows monitoring of the enclosure.

Figure 2:
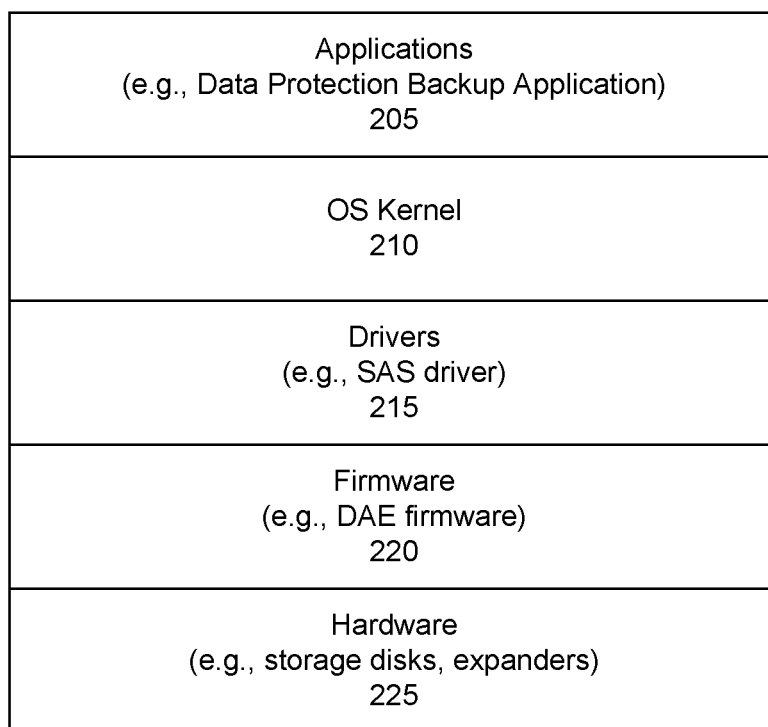
FIG. 2 shows a protocol stack in according with one or more embodiments.

FIG. 2 shows a layer diagram, stack diagram, or protocol stack. At a top of the stack is an application layer 205, followed by an operating system layer including kernel 210, followed by a device driver layer 215, followed by a firmware layer 220, and finally a hardware layer 225 at a bottom of the stack. The layers are arranged hierarchically with each layer responsible for a specific set of functions or services. Each layer is connected to a layer above or below through interfaces (e.g., application programming interface (API)) which define the communication protocols and data formats used to exchange data, requests, communications, and information between the layers.

For example, to access data stored in storage, the application generates a request. The application generating this request is considered to reside at the top of what may be referred to as a protocol stack. The request is passed down to the operating system, to a device driver, to firmware, and ultimately the storage disk (or other hardware). The requested data is retrieved from storage and the data begins its journey back up the protocol stack layer-by-layer and ultimately to the requesting client. Communications proceed layer-by-layer through the protocol stack. Each layer is responsible for a set of processing and packaging operations before handing off to a next layer.

Throughout the life of a device, a manufacturer of the device will generally release updates to firmware. The updates may include bug fixes, performance improvements, security patches, and so forth. Firmware updates can be installed either manually or automatically, depending on the device and its settings. Upgrading firmware of a device may involve the device turning off and on or resetting multiple times during the process. The firmware upgrade process involves the device proceeding through a series of stages in which it installs and configures various components of the new firmware.

Generally, each layer of the protocol stack is designed to generate notifications concerning the status of the components and services that a particular layer is responsible for so that the other layers can make the appropriate adjustments to the components and services that they are responsible for.

For example, upgrading firmware of a DAE causes internal components of the DAE, such as the expander and storage disks connected to the expander, to cycle through a series of resets. When, for example, a storage disk goes offline an event notification is generated indicating that the storage disk has been removed. When the storage disk comes back online, another event notification is generated indicating that the storage disk has been added. The event notifications are passed up through the layers of the protocol stack. As discussed, a firmware update may involve multiple resets. Thus, a particular storage disk may reset multiple times during the firmware update with corresponding event notifications being generated. A single disk array enclosure may include many dozens of storage disks. When each storage disk is generating multiple event notifications throughout the upgrade process that are passed up through the layers of the protocol stack, the vast number of event notifications to handle can quickly flood and overwhelm the upper layers such as the operating system kernel.

Upgrading firmware of disk array enclosures is a very common operation in a production environment. Yet, it especially challenging when performing upgrades in data protection systems. A data protection system has many more drives or storage disks as compared to primary storage, so the flooding events of device online/offline due the DAE reset imparts a heavy load for the storage management process. The heavy load causes performance degradation and may even cause device missing errors. For example, the operating system may become so overloaded with event notification messages that it fails to properly create the device files necessary to access the DAE.

In an embodiment, systems and techniques are provided to improve the DAE firmware upgrade process. In an embodiment, a framework drives the process of a DAE firmware upgrade, including: DAE firmware upgrade precheck logic to maintain data availability, data path failover logic, SAS port state management logic and DAE firmware upgrade start/monitor logic.

In an embodiment, a SAS driver introduces a new state that may be referred to as "expander_only" for the SAS port which is working with the DAE firmware upgrade. In this new state, the driver exposes only SAS expander online/offline events to the upper layer application but not online/offline events associated with any other drives or storage disks. This helps to prevent the flooding events caused by the many drives cycling between offline and online within the relatively short time window of a firmware upgrade. In an embodiment, to support the port's new state, the driver's firmware event handling workflow is adjusted.

Figure 3:
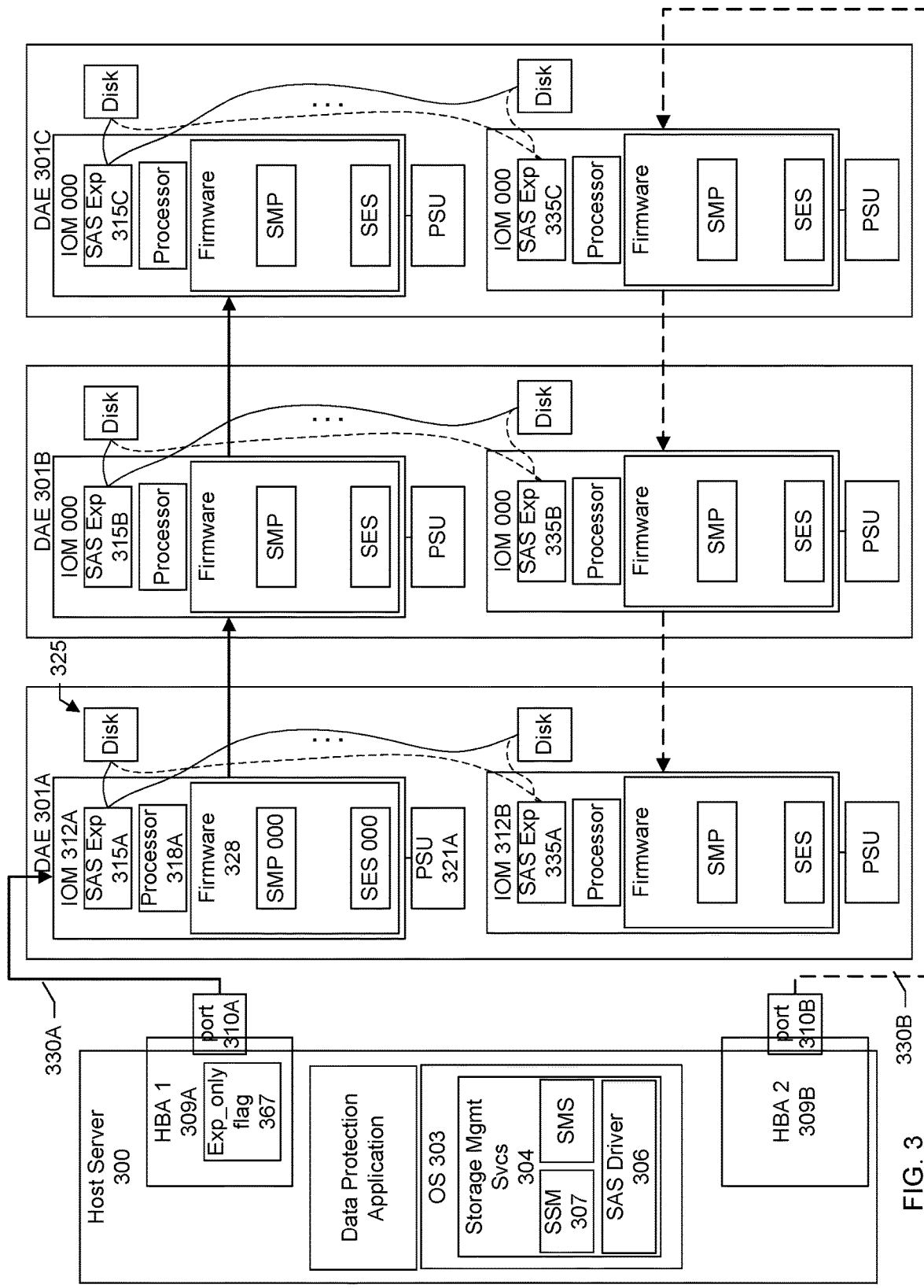
FIG. 3 shows a storage topology of a data protection system in accordance with one or more embodiments.

FIG. 3 shows a backend storage topology of a data protection system (e.g., Data Domain). There is a host server 300 and a set of disk array enclosures 301A-C. The host server includes an operating system 303 having storage management services 304 and a SAS driver 306. The storage management services includes a storage subsystem manager (SSM) 307 which is responsible for controlling the workflow of a DAE firmware upgrade.

In a specific embodiment, there are multiple disk enclosures deployed in a data protection system as backend storage devices. They are connected to each other by Serial-Attached SCSI (SAS) cables and then attached to the host HBAs, which constitute the SAS domain topology. In an embodiment, the disk array enclosures are attached in a SAS multipathing configuration. Multipathing provides high availability by allowing data to use multiple paths to the arrays from the host bus adaptors on the same server or on different servers.

In an embodiment, the host server includes first and second host bus adaptors 309A,B having first and second SAS ports 310A,B, respectively. Each disk array enclosure includes hardware components such as an input/output module (IOM) 312A, serial attached SCSI (SAS) expander 315A, processor 318A, power supply unit 321A, and a set of storage disks 325 connected to the IOM via the SAS expander. As discussed, a DAE includes firmware 328 that may be embedded in the SAS expander or IOM.

A SAS expander is a physical device that may have components such as a controller chip, memory storing firmware, and buffer (e.g., ring buffer) to which logs are written. A SAS expander includes ports to connect devices and provides switching capabilities. A SAS expander may expose a programmatic interface (e.g., application programming interface (API)) through which commands may be received. DAEs may be connected to each other via their SAS expanders. A SAS domain is a group of SAS expander devices and end devices that are physically connected. End devices refer to devices that are at ends relative to the SAS expander. For example, the host bus adaptor may be referred to as an initiator or SCSI initiator. The host bus adaptor issues SCSI commands to other SCSI target storage devices (e.g., disks or disk arrays). The target storage, upon receiving the SCSI commands, provides the requested IO data transfers accordingly.

The disks in each DAE are routed to different host bus adapter ports via one or more SAS expanders, such that there are two paths to the server. One of the first or second paths may be referred to as an active path. Another of the first or second paths may be referred to as a secondary path. The secondary path provides a redundant path to the DAEs so they are still accessible even if the active path becomes unavailable. More specifically, each DAE is chained to another DAE via first and second chains 330A,B, respectively. First chain 330A is shown using a solid line. Second chain 330B is shown using a broken line. The chains include cabling to interconnect the DAEs and the server. Each SAS expander in the DAEs form part of the first chain; while each peer SAS expander in the DAEs form part of the second chain. The chaining arrangement facilitates redundancy and reliability.

For example, starting from the first HBA, first SAS expander 315A is connected to the first HBA and forms part of the first chain. Specifically, the first chain includes first SAS expander 315A in first DAE 301A, which in turn is chained to second SAS expander 315B in second DAE 301B, which in turn is chained to third SAS expander 315C in third DAE 301C.

Similarly, starting from the second HBA, third peer SAS expander 335C is connected to the second HBA and forms part of the second chain. Specifically, the second chain includes third peer SAS expander 335C in third DAE 301C, which in turn is chained to second peer SAS expander 335B in second DAE 301B, which in turn is chained to first peer SAS expander 335A in first DAE 301A.

A DAE, or more specifically a SAS expander in the DAE, can be described relative to other SAS expanders in other DAEs along the same chain. For example, first SAS expander 315A has second, and third SAS expanders 315B-C as downstream neighbors. In other words, the first SAS expander is upstream from the second SAS expander. The first and second SAS expanders are upstream from the third SAS expander.

Similarly, third peer SAS expander 335C has second and first peer SAS expanders 335B-A as downstream neighbors. In other words, the third peer SAS expander is upstream from the second peer SAS expander. The third and second peer SAS expanders are upstream from the first peer SAS expander.

Storage configurations that make use of a SAS interconnect typically include an SAS HBA with one or more external ports that are cabled to one or more storage enclosures, each of which contain and provide individual access to several SAS drives. A SAS HBA may have, for example, 4, 8, 16, or even 32 ports. Each port can support multiple drives through the use of expanders.

The number of drives in each enclosure usually ranges from 12-15 in smaller enclosures and from 60-100 in dense enclosures. Because most SAS drives support being connected to two SAS domains for redundancy purposes, this is achieved by the enclosure having two separate IO modules (e.g., IOM 312A,B), each of which provide access to either side A or side B of the drives. Each of these IOMs also provides a management connection via a SCSI Enclosure Services (SES) device. This device allows for status/control of the various components within the enclosure.

SAS topology allows for the daisy chaining of enclosure. For example, a SAS cable can be connected from the host HBA port to an enclosure (e.g., IOM 312A for first DAE 301A). Then IOM 312A for DAE 301A can be connected to an expansion port on IOM 315B in second DAE 301B, such that all devices in the first and second DAEs can be accessed via the single SAS HBA port.

The firmware for the IOM can be updated in-band through the SES device. When this occurs, the IOM is reset so that the processor(s) on the IOM can reboot using the updated firmware. During the reset, the underlying SAS expander(s) is/are reset. This will cause temporary loss of access to all drives, in the targeted enclosure, via the IOM being reset. It will also cause temporary loss of access to all enclosure devices (drives and SES devices) on the path that is connected to the IOM undergoing a reset.

In these firmware update conditions, there is a tremendous amount of stress due to the number of devices that go away and come back online. There is stress at the SAS discovery level and even more so at the OS level, as it not only enumerates the basic devices, it also scans for partitions and creates explicit device files for each of those, and then stacks on any multipath layer handling on top of that. Occasionally, a firmware update will result in an IOM needing to be reset more than once as well. A firmware update can result in a flood of topology change notifications within a relatively short period of time that can be difficult to bookkeep and track.

Updates on larger topologies are much more prone to reliability issues as it becomes possible that the OS event handling could drop events which can result in missing user mode device files. (device online/offline events are communicated by a netlink mechanism, which works in unreliable "best-efforts" way. So, when the events overflow the receiver buffer, events drop happens.) Netlink is a socket-based communication protocol used for inter-process communication (IPC) between the kernel and user-space processes in an operating system such as Linux or Linux-based operating systems. Netlink enables different kernel subsystems to communicate with user-space processes and other kernel subsystems in a standardized way. "Best-efforts" is a type of service that attempts to deliver the event notifications to their destination, but there is no guarantee of delivery or quality of service. This means that if there is congestion or other issues, some event notifications may be dropped. The dropping of event notifications can result in hundreds or even thousands of device files not getting created.

Below are some problems associated with upgrading firmware of a DAE:
1) Huge stress on discovery logic of SAS driver.
2) Huge stress on device creation and deletion logic of OS.
3) Storage manager application performance degradation due to the flooding device online/offline events.
4) User mode device missing due to the overflow of device online/offline events.

Figure 4:
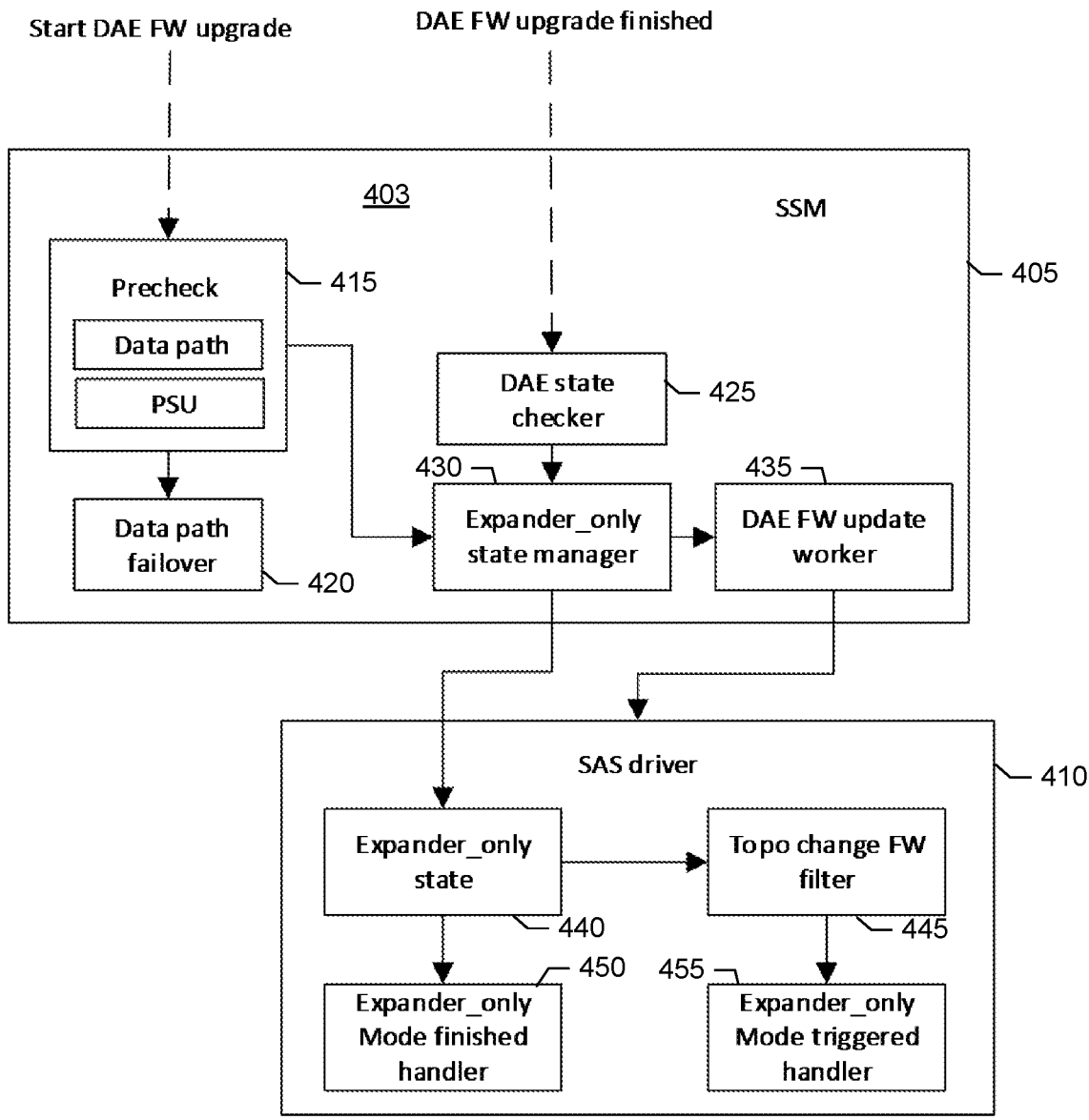
FIG. 4 shows a framework for a DAE firmware upgrade in accordance with one or more embodiments.

FIG. 4 shows a block diagram of a framework 403 for handling firmware upgrade of a DAE. As shown in the example of FIG. 4, there is a storage subsystem manager (SSM) 405 and SAS driver 410. This framework includes a set of components including a precheck unit 415, data path failover unit 420, DAE state checker 425, expander_only state manager 430, and DAE firmware update worker 435. The SAS driver includes an expander_only state 440, topology change firmware filter 445, expander_only mode triggered handler 450, and expander_only mode finished handler 455.

As discussed, SSM controls the workflow of the DAE firmware upgrade process. Consider, as an example, SAS port 310A (FIG. 3) as an example. Table A below shows a flow of the upgrade process. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

TABLE A

Figure 5:
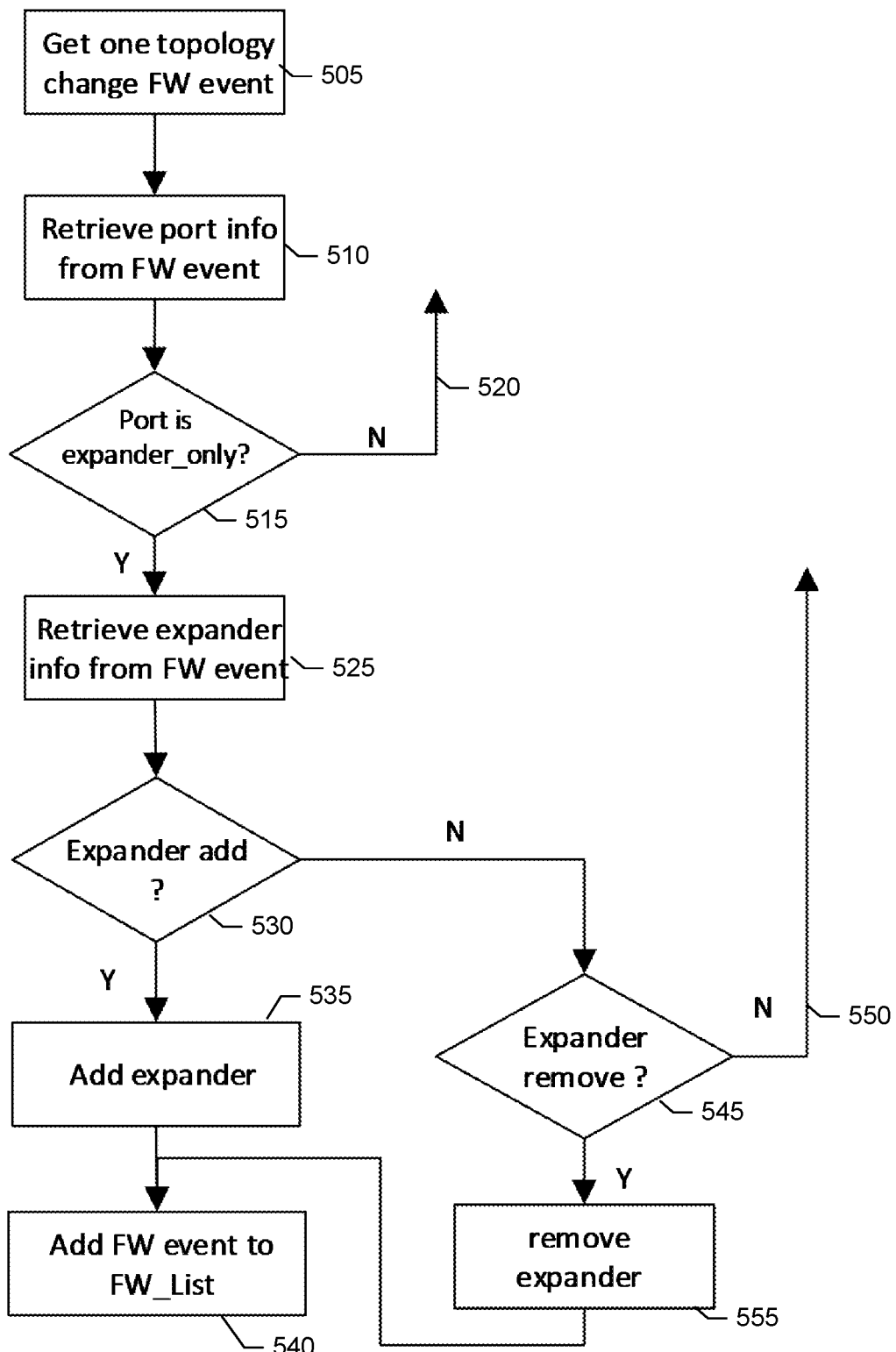
FIG. 5 shows a flow for handling topology change events during an "expander_only" mode in accordance with one or more embodiments.
Figure 6:
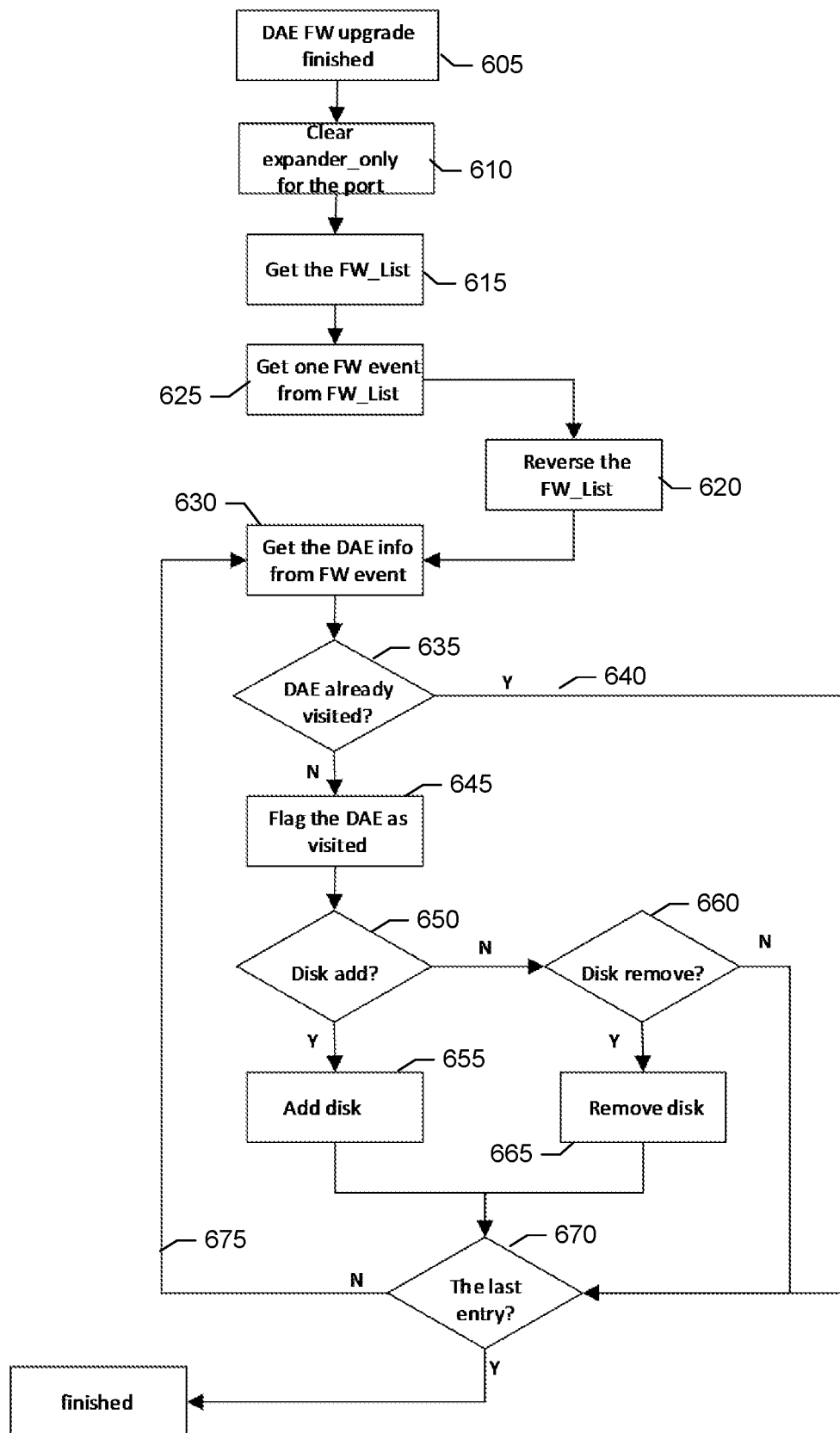
FIG. 6 shows a flow for handling topology change events after a firmware upgrade in accordance with one or more embodiments.

| Step | Description |
|---|---|
| 1 | SSM determines that one or more enclosures/PSUs on port 310A need to be updated, and if not move on to the next port. |
| 2 | Precheck logic validates that it is safe to upgrade DAEs' firmware on port A. The validation includes: a) Ensuring that all enclosures and devices downstream of port A have operational secondary paths; and b) Ensuring that each enclosure has secondary PSU in good status when PSU firmware update is needed. |
| 3 | Data path failover forces active path from port A to a different port (e.g., port A'). |
| 4 | Expander_only state manager enables an "expander_only" mode on port A. Here, "expander_only" indicates only handling expander online/offline events from SAS driver level, with skipping the disks online/offline events. This new mode plays a key role in filtering out the flooding disks' online/offline events during the DAE firmware upgrade process. |
| 5 | SAS driver handles only add/remove expander device events from the topology change events and ignores disk online/offline events. This may be referred to as expander_only mode triggered handler and its details are shown in FIG. 5. |
| 6 | DAE firmware update worker performs enclosure/PSU firmware upgrades on port A. |
| 7 | DAE state checker monitors all DAE state and checks whether their firmware are updated to the target. If yes, expander_only state manager clears the "expander_only" mode on port A. |
| 8 | SAS driver handles all pending disk online/offline firmware events during the expander_only time window. This is different from step 5, as it handles all disks online/offline events. This may be referred to as expander_only mode finished handler and its details are shown in FIG. 6. |
| 9 | Data path failover rebalances active paths. |
| 10 | Prepare to handle the DAE FW upgrade of the next port. |

FIG. 5 shows a flow during an expander_only mode (see, e.g., step 5, table A). More particularly, FIG. 5 shows a flow of the SAS driver during handling of a topology change FW event when a SAS port is set as "expander_only" mode by SSM.

In a step 505, the driver receives a firmware event notification indicating a topology change of the backend storage. In a step 510, the driver retrieves the port information from the event. In a step 515, the driver checks if the port is set as "expander_only" mode by SSM. If not set, it skips out (step 520).

If, however, the port is set as "expander_only" the driver retrieves the expander information from the firmware event notification (step 525). If the information indicates an add/remove expander event, do the device create/deletion and advertise the device online/offline to the OS/application scope. The number of expanders in a DAE are far less than the number of storage disks in the DAE which in turn means far fewer event notifications for expanders as compared to storage disks. Thus, firmware event notifications for the expanders can be advertised to the upper layers of the protocol stack, e.g., operating system kernel, without overwhelming the upper layers.

More particularly, in a step 530, a determination is made as to whether the event concerns adding an expander. If the event concerns adding an expander, in a step 535, the expander is added with the driver facilitating creation of a device file for the expander. In a step 540, the firmware event is added to a list for later process. The list may be referred to as a firmware list (e.g., FW_list).

If event does not concern adding an expander, in a step 545, a determination is made as to whether the even concerns removing an expander. If the event does not concern removing or adding an expander, the driver ignores the event thereby blocking the event from being received by upper layers of the protocol stack. In other words, the driver does not advertise the event to the upper layers (e.g., operating system kernel or application) (step 550).

If, however, the event concerns removing an expander, the expander is added with the driver facilitating deletion of the device file associated with the removed expander (step 555).

In step 540, after handling removal of the expander, the firmware event is moved or added to the newly introduced FW_list for the later handling. As discussed, the algorithm skips the disks' online/offline events handling which thus masks the large number of device online/offline events. Instead, only expander change events are handled.

FIG. 6 shows a flow of the SAS driver when it receives a notification from SSM that the firmware upgrade has completed. In particular, FIG. 6 shows the handling of the firmware events added to the firmware list, e.g., FW_list, (see, e.g., step 8, table A). When DAE state checker detects all DAEs in the chain have finished FW upgrade (step 605), it notifies expander_only state manager to clear the port's expander_only flag in the driver (step 610).

In a step 615, the SAS driver gets the FW_List and reverses it (step 620). In an embodiment, the original FW_list is a first in first out (FIFO) queue. So, if event X is ahead of event Y, it means X happens before Y. After the reversal, the head of the FW_list is the latest event and the tail is the oldest event. Then it begins to traverse the FW_list's events one by one (step 625), which indicates for DAE X, always visiting its latest topology change events first.

In a step 630, it gets one topology change event and retrieves the DAE information from it. First, in a step 635, it checks whether it has already handled the same DAE in this cycle of event handling. The technique avoids handling disks online/offline events from the same DAE multiple times but only cares about the disks' latest state. For example, during the DAE firmware upgrade process, a DAE may go away and come back four times. The technique ignores the first three online/offline events and instead focuses on the final state of the disks. It not only can ensure the disks' final state is correct, but also mask most of the meaningless topology change messages, which improves the whole device discovery process.

Then, if the DAE already visited, skip out (step 640). A DAE that has been visited means that the DAE's final state has already previously been handled.

If not, it indicates the final state of the DAE needs to be handled with disk creation or deletion. More particularly, in a step 645, the DAE is flagged as visited. In a step 650, a determination is made as to whether a storage disk has been added. If the event indicates adding of a disk, in a step 655, the driver facilitates the adding of the disk including device file creation. If the event does not indicate a storage disk has been added, in a step 660, a determination is made as to whether a storage disk has been removed. If the event indicates removal of a disk, in a step 665, the driver facilitates the removal of the disk including device file removal. If the event does not indicate either of a storage disk being added or remove, the process skips out (step 640).

In a step 670, a determination is made as to whether the last event from the firmware list has been processed. If not, the process loops back (675) to step 630 to process the next pending topology change events.

A benefit of the technique is that topology change events associated with the expanders are handled so that progress of the firmware update can be tracked, but storage disk related events are deferred until after the upgrade, thereby reducing the number of events that are propagated up the protocol stack during the firmware upgrade time window. Moreover, the technique avoids handling intermediate events as these where a storage disk cycles through multiple resets can be considered insignificant. Instead, only the final or ending state of the DAE is examined.

In an embodiment, systems and techniques provide: 1) A novel framework to improve the process of disk array enclosure firmware upgrade for a data protection system; and 2) An enhanced method of a SAS driver to handle the flooding topology change events in the data protection system.

Figure 7:
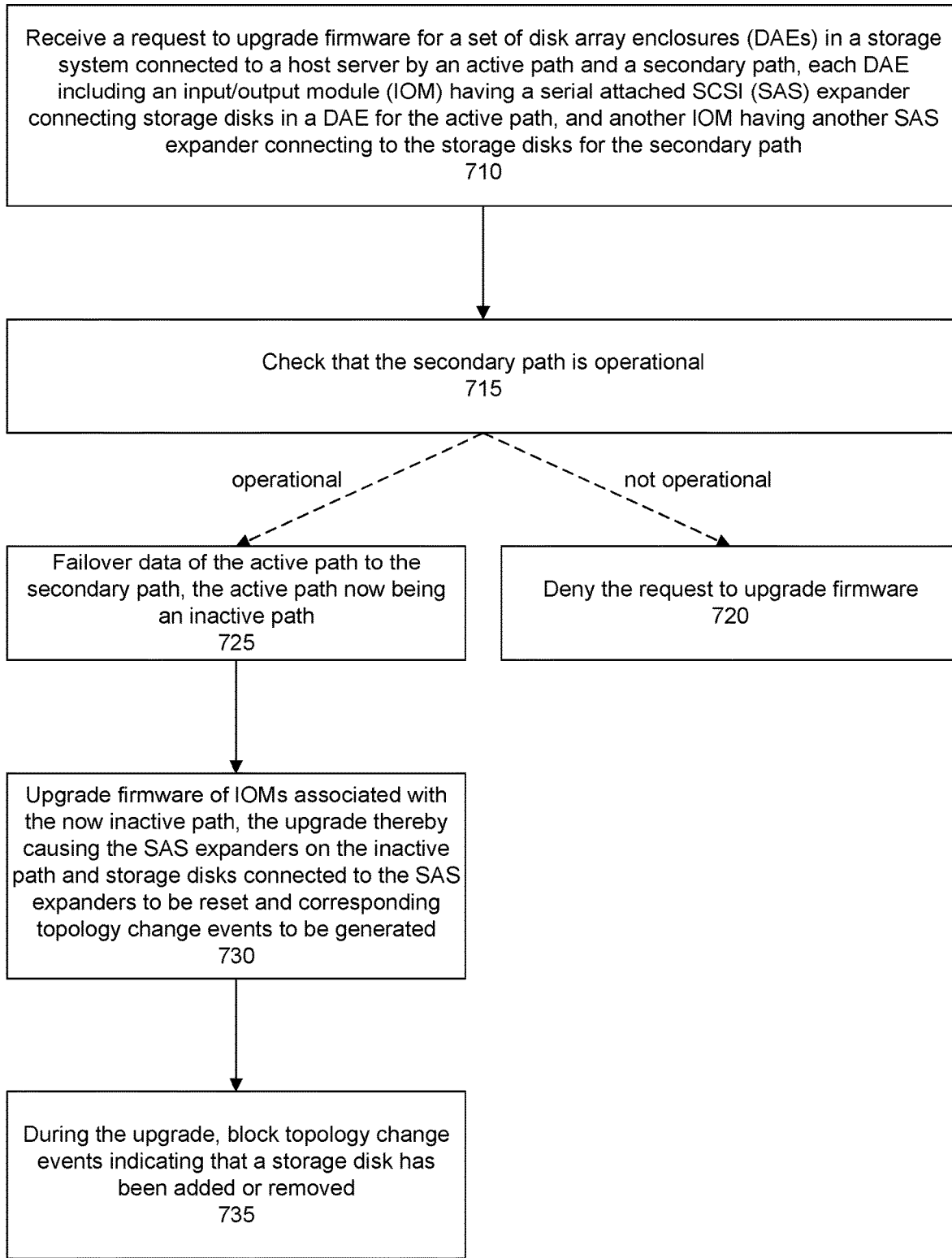
FIG. 7 shows an overall flow for handling topology change events when upgrading firmware of a DAE in accordance with one or more embodiments.

FIG. 7 shows another flow for the DAE firmware upgrade process. In a step 710, a request is received to upgrade firmware for a set of DAEs in a storage system connected to a host server by an active path and a secondary path. The request may, for example, be requested by a user and received by the storage subsystem manager (SSM). Each DAE includes a first input/output module (IOM) having a serial attached SCSI (SAS) expander connecting storage disks in a DAE for the active path, and another or second IOM having another SAS expander connecting to the storage disks for the secondary path.

In a step 715, a check is made as to whether the secondary path is operational. The check may include, for example, issuing commands to the DAEs to verify the health and status of the secondary path. If the check indicates that the secondary path is not operational (e.g., request for health check times out or response from DAE indicates secondary path not available), the request to upgrade the firmware is denied (step 720). That is, a firmware upgrade of the DAEs in a storage system is blocked when there is only a single path from the host server to the storage system. An alert may be generated for the customer user indicating that the firmware upgrade could not proceed due to the lack of a secondary path.

If, however, the check indicates that the secondary path is operational, data of the active path is failed over to the secondary path, the active path now being an inactive path (step 725). The failover may include forcing the active path from a first port to a second port, different from the first port. Thus, the storage disks can remain accessible throughout the upgrade process via the secondary path.

In a step 730, firmware of the DAEs or, more particularly, IOMs associated with the now inactive path is upgraded. As discussed, the upgrade causes the SAS expanders on the inactive path and storage disks connected to the SAS to be reset and corresponding topology change events to be generated. In a step 735, during the upgrade, topology change events indicating that a storage disk has been added or removed are blocked, ignored, filtered out, or otherwise not advertised to upper layers of the protocol stack.

The filtering of such event notifications dramatically decreases the number notifications that the upper layers of the protocol stack receive, handle and process. As a result, there is no need to stagger the firmware upgrade process. The multiple resets that a storage disk may undergo can be considered intermediate events that, within the context of a DAE firmware upgrade, do not have to necessarily be reported up the protocol stack. In an embodiment, systems and techniques are provided to handle the final state of a DAE to ensure that all storage disks are accounted for.

Figure 8:
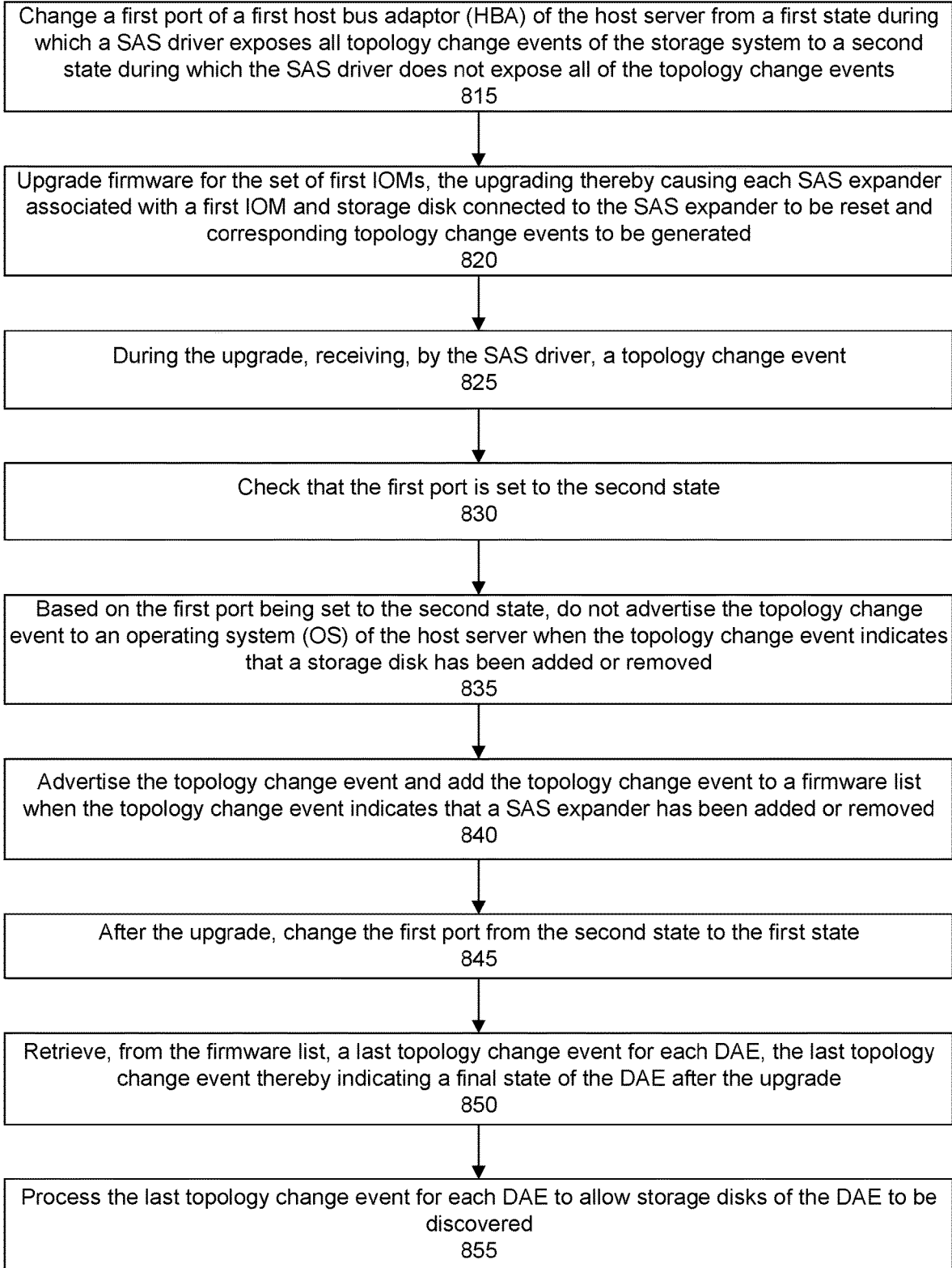
FIG. 8 shows a more detailed flow for the handling of topology change events at a driver-level in accordance with one or more embodiments.

FIG. 8 shows further detail of a flow for conducting the firmware upgrade (step 730, FIG. 7). In a step 815, a first port of a first host bus adaptor (HBA) of the host server is changed from a first state to a second state. During the first state, a SAS driver exposes all topology change events of the storage system to upper layers of the protocol stack (e.g., operating system kernel). During the second state, the SAS driver does not expose all of the topology change events of the storage system to the upper layers of the protocol stack.

Referring back now to FIG. 3, in an embodiment, changing the state includes setting a flag 367 of the first host bus adaptor to indicate that the advertising of the topology changes should be limited. As discussed, in an embodiment, the flag may be referred to as an "expander_only" (exp_only) flag. When the flag is set, topology change events associated with expanders are advertised by the driver while topology change events associated with storage disks are not advertised. In other words, at a start of a DAE firmware upgrade, a SAS port is flagged as "expander_only." During the upgrade, the SAS driver determines whether a topology change should be advertised by first checking a state of the SAS port. When the SAS port is flagged as "expander_only," the SAS driver handles expander offline/online topology change events, but ignores storage disk offline/online topology change events.

In an embodiment, the example shown in FIG. 3 may be referred to as a driver-level system and technique for conducting DAE firmware upgrades. The driver-level approach can be used in cases where the kernel (and more particularly, SAS driver) can be customized.

Referring back now to FIG. 8, in a step 820, a process begins upgrading firmware for the set of first IOMs. As discussed, the upgrade causes each SAS expander associated with a first IOM and storage disks connected to the SAS expander to be reset and corresponding topology change events to be generated. For example, a topology change event may be generated indicating that a SAS expander has been removed. A topology change event may be generated indicating that a SAS expander has been added. A topology change event may be generated indicating that a storage disk has been removed. A topology change event may be generated indicating that a storage disk has been added.

In a step 825, during the upgrade, the SAS driver receives a topology change event. Rather than immediately advertising the topology change event, however, in a step 830, the driver checks that the first port is set to the second state (e.g., "expander_only" flag has been set). Upon verifying that the first port is set to the second state, the SAS driver does not advertise the topology change to the upper layer of the protocol stack (e.g., operating system kernel of the host server) when the topology change event indicates that a storage disk has been added or removed (step 835).

In a step 840, however, when the topology change event indicates that a SAS expander has been added or removed, the topology change event is advertised and the event is added to a list. As discussed, the list may be referred to as a firmware list ("FW_list").

Steps 825-840 repeat throughout the upgrade process. In a step 845, after the upgrade of firmware has completed, the first port is changed from the second state to the first state. In other words, the "expander_only" flag associated with the first HBA is cleared, canceled, or removed.

In a step 850, a last topology change event for each DAE is retrieved from the firmware list. The last topology change event indicates a final state of a DAE after the firmware upgrade. In a step 855, the last topology change event for each DAE is processed to allow storage disks of each DAE to be discovered.

As discussed, in an embodiment, the firmware list is a first in first out (FIFO) list including a head and a tail. In a FIFO list, a first element added to the list (e.g., enqueued onto the list) is processed first and a last or newest element added to the list is processed last. The upgrade process may generate a large number of intermediate topology change event notifications as expanders and storage disks are reset. For purposes of post-firmware upgrade processing, however, the primary concern is the final state of the DAE as it relates to the expanders and storage disks. The final state of the DAE is thus indicated by the last topology change event associated with the DAE concerning the expanders and storage disks. Thus, in an embodiment, the FIFO list is reversed such that a latest topology change event is at the head of the list and an oldest topology change event is at the tail.

After reversing the entries in the firmware list, the topology change events recorded in the firmware list are processed by retrieving (e.g., dequeuing) a change event at a head of the list and identifying a DAE specified in the retrieved topology change event. If the DAE identified in the retrieved topology change event has not been flagged as visited, the DAE is flagged as visited and a storage disk add event or a storage disk remove event as recorded in the retrieved topology change event is processed (e.g., advertised). Once the event has been processed, a next topology change event is retrieved (e.g., dequeued) from the firmware list for processing.

If, however, the DAE has already been marked as visited, the topology change event is skipped as it concerns an intermediate event and the next topology change event is retrieved (e.g., dequeued) from the firmware list for processing. The above process repeats until all topology change events recorded in the firmware list have been examined (see, e.g., FIG. 6).

In other words, the topology change events recorded in the firmware list are processed in reverse chronological order. Processing in reverse chronological order helps to ensure that it is the final state of a DAE (including final state of the expander and storage disks) that is processed rather than some intermediate state during the firmware upgrade process. It should be appreciated that a FIFO list is merely an example of a data structure that may be used to store the topology change events generated during the firmware upgrade. Other equivalent or competent data structures may instead or additionally be used (e.g., stack data structure) and appropriate adjustments made to process topology change events indicating final state of a DAE while skipping events associated with intermediate states.

Figure 9:
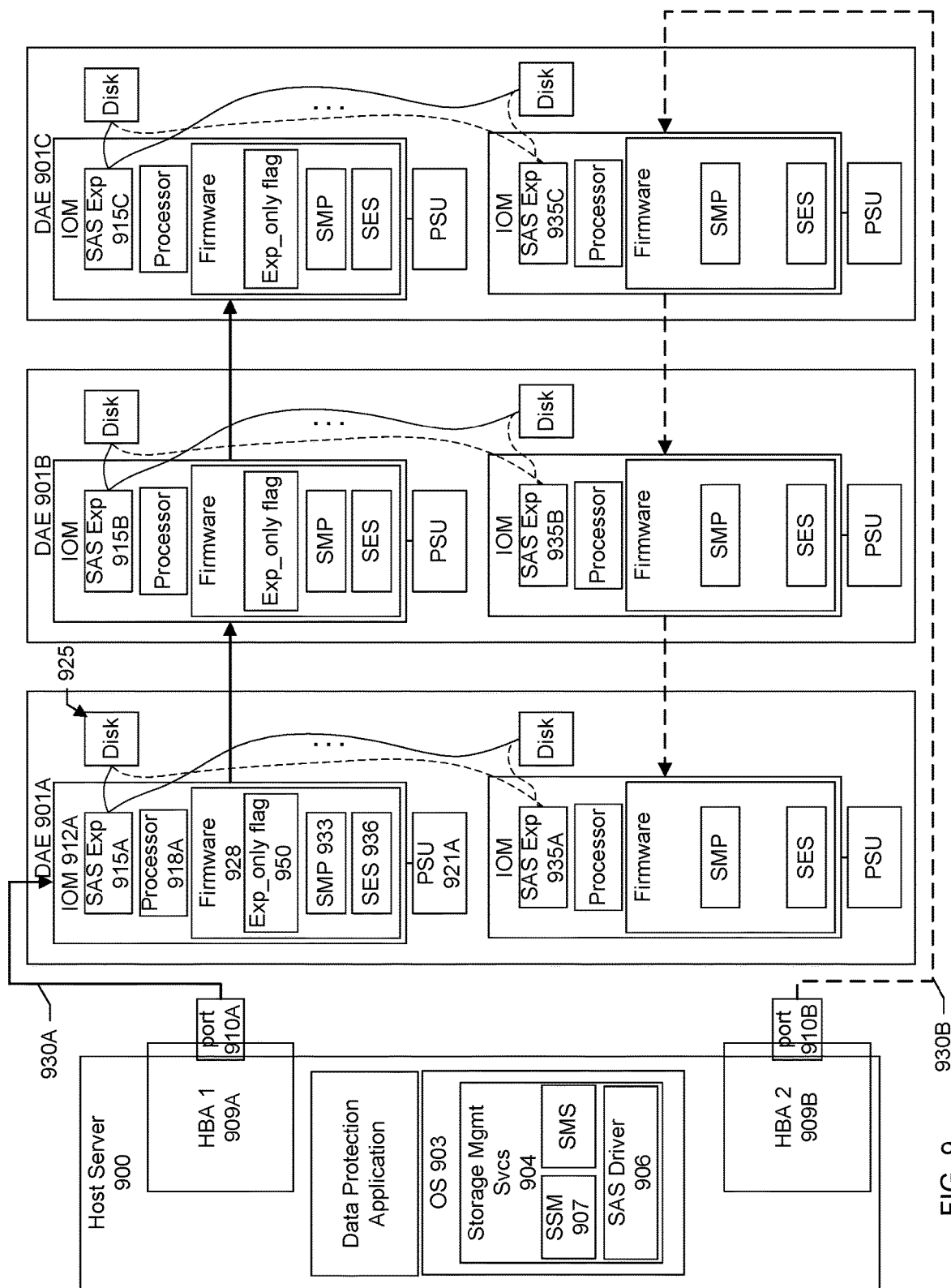
FIG. 9 shows a block diagram for handling topology change events at a firmware-level in accordance with one or more embodiments.

FIG. 9 shows a backend storage topology of a data protection system within which DAE firmware upgrades may be conducted according to another embodiment. The system shown in FIG. 9 is similar to the system shown in FIG. 3. For example, there is a host server 900 and a set of disk array enclosures 901A-C. The host server includes an operating system 903 having storage management services 904 and a SAS driver 906. The storage management services includes a storage subsystem manager (SSM) 907 which is responsible for controlling the workflow of a DAE firmware upgrade.

The disk array enclosures are connected to each other by Serial-Attached SCSI (SAS) cables and then attached to the host HBAs, which constitute the SAS domain topology. In an embodiment, the disk array enclosures are attached in a SAS multipathing configuration. Multipathing provides high availability by allowing data to use multiple paths to the arrays from the host bus adaptors on the same server or on different servers.

The host server includes first and second host bus adaptors 909A,B having first and second SAS ports 910A,B, respectively. Each disk array enclosure includes hardware components such as an input/output module (IOM) 912A, serial attached SCSI (SAS) expander 915A, processor 918A, power supply unit 921A, and a set of storage disks 925 connected to the IOM via the SAS expander. As discussed, a DAE includes firmware 928 that may be embedded in the SAS expander or IOM. The firmware includes a SAS Management Protocol (SMP) 933 and Small Computer System Interface (SCSI) Enclosure Service (SES) 936.

SMP and SES are protocols used in the management and control of SAS-based storage systems. SMP allows communication between SAS devices in a storage system. It provides a way for devices such as host bus adapters, expanders, and drives to communicate with each other and exchange information about their capabilities, status, and configuration. The SMP protocol is used to perform various management functions such as discovering new devices, configuring device parameters, monitoring device health, and managing firmware updates.

The SES protocol provides a way for the host to monitor and control the physical environment of the storage system. This includes monitoring the temperature, voltage, and other environmental factors within the storage system, as well as monitoring the status of individual components such as drives, fans, and power supplies. The SES protocol also provides a way for the host to receive notifications of any environmental or component failures within the storage system, allowing administrators to take appropriate action to prevent data loss or system downtime.

The disks in each DAE are routed to different host bus adapter ports via one or more SAS expanders, such that there are two paths to the server. One of the first or second paths may be referred to as an active path. Another of the first or second paths may be referred to as a secondary path. The secondary path provides a redundant path to the DAEs if, for example, the active path becomes unavailable. More specifically, each DAE is chained to another DAE via first and second chains 930A,B, respectively. First chain 930A is shown using a solid line. Second chain 930B is shown using a broken line. The chains include cabling to interconnect the DAEs and the server. Each SAS expander in the DAEs form part of the first chain; while each peer SAS expander in the DAEs form part of the second chain. The chaining arrangement facilitates redundancy and reliability.

For example, starting from the first HBA, first SAS expander 915A is connected to the first HBA and forms part of the first chain. Specifically, the first chain includes first SAS expander 915A in first DAE 301A, which in turn is chained to second SAS expander 915B in second DAE 901B, which in turn is chained to third SAS expander 915C in third DAE 901C.

Similarly, starting from the second HBA, third peer SAS expander 935C is connected to the second HBA and forms part of the second chain. Specifically, the second chain includes third peer SAS expander 935C in third DAE 301C, which in turn is chained to second peer SAS expander 935B in second DAE 901B, which in turn is chained to first peer SAS expander 935A in first DAE 301A.

A DAE, or more specifically a SAS expander in the DAE, can be described relative to other SAS expanders in other DAEs along the same chain. For example, first SAS expander 915A has second, and third SAS expanders 915B-C as downstream neighbors. In other words, the first SAS expander is upstream from the second SAS expander. The first and second SAS expanders are upstream from the third SAS expander.

Similarly, third peer SAS expander 935C has second and first peer SAS expanders 935B-A as downstream neighbors. In other words, the third peer SAS expander is upstream from the second peer SAS expander. The third and second peer SAS expanders are upstream from the first peer SAS expander.

The system of FIG. 9, however, shows a DAE firmware-level technique to handle the DAE firmware upgrade process rather than a driver-level technique as shown in FIG. 3. Specifically, a state or flag 950, e.g., "expander_only" flag is introduced at the firmware-level of a DAE to indicate that a DAE is undergoing a firmware upgrade and suppress topology change events from being propagated to host OS kernel.

Figure 10:
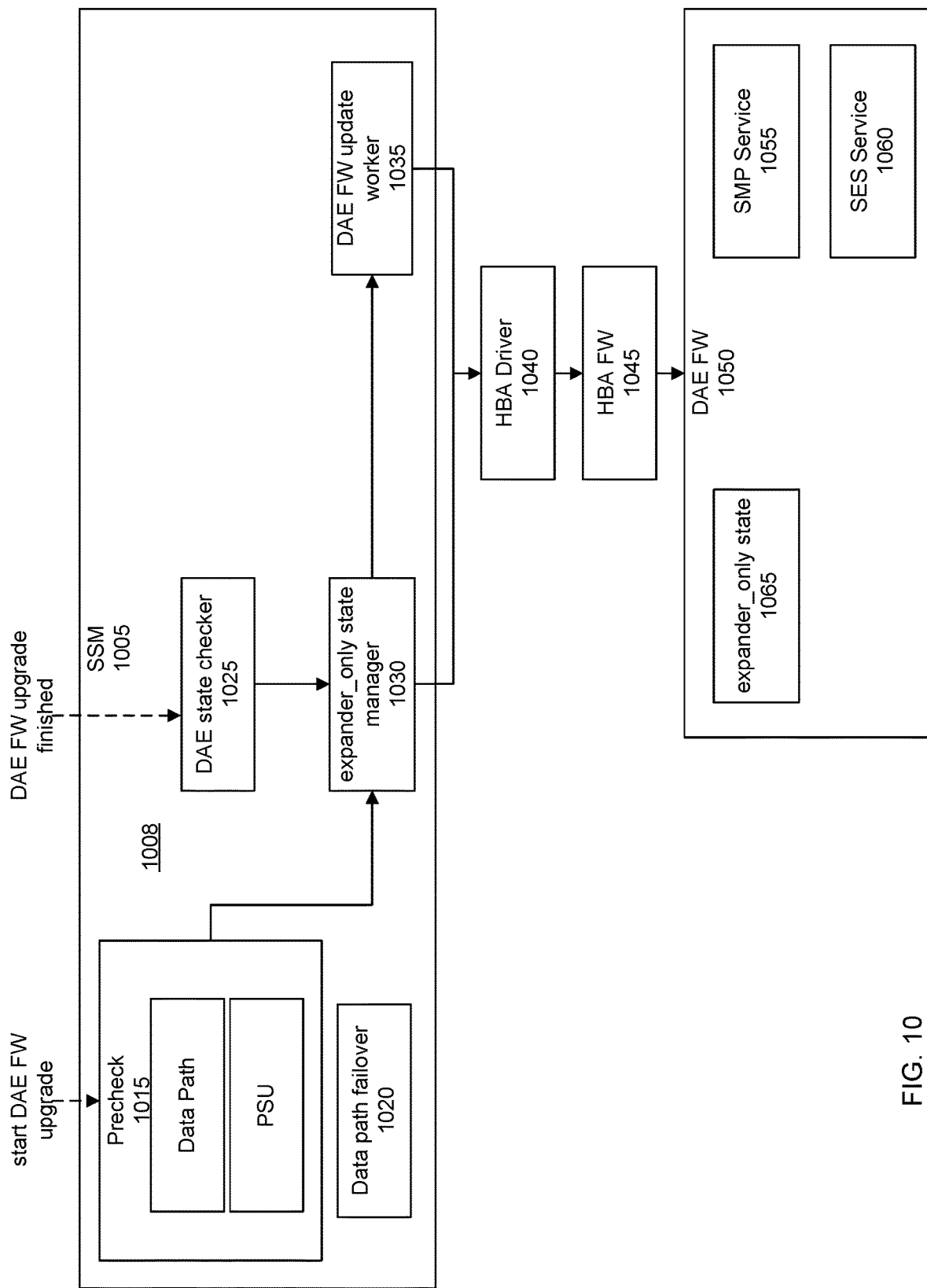
FIG. 10 shows another block diagram for handling topology change events at a firmware-level in accordance with one or more embodiments.

FIG. 10 shows a block diagram for handling topology change event notifications at the firmware level. The block diagram shown in FIG. 10 is similar to the block diagram shown in FIG. 4. For example, there is a storage subsystem manager (SSM) 1005 of a host server operating system that includes a framework 1008 for driving the process of a DAE firmware upgrade. This framework includes a set of components including a precheck unit 1015, data path failover unit 1020, DAE state checker 1025, expander_only state manager 1030, and DAE firmware update worker 1035. These framework components are similar to the framework components shown in FIG. 4 and described in the accompanying discussion.

As further shown in the example of FIG. 10, there is a host bus adaptor driver 1040, host bus adaptor firmware 1045, and DAE firmware 1050. The DAE firmware resides at a level below the HBA firmware, HBA driver, and SSM. In other words, the HBA firmware, HBA driver, and SSM are at levels above a level of the DAE firmware. The HBA driver and HBA firmware are at levels between the SSM and DAE firmware.

As discussed, firmware of the DAE includes SMP 1055 and SES 1060. In an embodiment, a state or flag, e.g., "expander_only" state 1065 is introduced at the DAE firmware level during the firmware upgrade process of a DAE.

A driver-level technique, such as shown in the example of FIG. 3, works well for a data protection platform whose kernel (SAS driver) can be customized. However, for other product lines, like integrated platforms which employ a generic kernel or even a third-party kernel, modifying the kernel or driver is not feasible. That is, in some cases, modifying code of the driver may not be available.

In an embodiment, systems and techniques provide for a DAE firmware level approach that handles topology change events during a firmware upgrade. Such a technique can be used in cases where the OS kernel or SAS driver are provided by a third party. In other words, a driver-level technique can be used for a data protection product where modification or customization of the kernel is available. A DAE firmware-level technique can be used for a data protection product whose kernel is generic or third-party. The DAE firmware-level technique reduces the noise in the SAS link, thereby reducing bugs about reliability.

The driver-level technique and DAE firmware-level technique involve different components to implement and different implementations details. More particularly, the driver-level technique is implemented in the SAS driver. The DAE firmware-level technique, in contrast, is implemented in the DAE firmware which is usually provided by disk enclosure vendors. Regarding implementation details, the driver-level technique seeks to optimize the hotplug uevent handling logic in SAS driver. A hotplug uevent refers to a notification event that is generated by the kernel when a SAS device is inserted or removed while the system is running.

The term "hotplug" refers to the ability to add or remove devices while the system is powered on, without the need for a reboot. This is possible because the SAS driver can dynamically detect and configure new devices as they are added, and remove them safely when they are no longer present. The hotplug uevent provides information to the SAS driver about the device that was added or removed, such as its vendor and model ID, its physical location in the system, and other relevant details. The driver can use this information to initialize the device, configure it for use, and update its internal data structures to reflect the current system configuration.

The DAE firmware-level technique seeks to optimize the SMP and SES service in DAE firmware. In an embodiment, the DAE firmware-level technique shares the DAE firmware upgrade framework with the driver solution. When the expander_only state is set in the DAE firmware, a process of the firmware marks the state of all drives in the DAE as vacant in both the SMP (SAS Management Protocol) and SES (SCSI Enclosure Service) service.

So, the HBA firmware and driver discovery logic can see only the expander but no attached drives in the DAE, thereby preventing the device discovery flooding events in the system. The SAS driver will know that the storage disks are absent in a particular DAE, but will not be exposed to the underlying detail or events associated with the storage disks as they undergo multiple resets during the firmware upgrade process. Such events are hidden from the SAS driver. Once the firmware upgrade is complete, the "expander_only" flag in the firmware is cleared. After the "expander_only" flag is cleared, the SMP/SES service can return the real or actual drive information to the HBA side.

Systems and techniques provide for defining how to set and clear the "expander_only" flag in the DAE firmware. In an embodiment, setting and clearing the flag is accomplished by the ESES protocol using a "send diagnostic." "Send diagnostic" is a command used to initiate a self-test or diagnostic routine on an enclosure or device that supports the SES/SMP protocols. The SES/SMP protocols are used to manage and monitor the health and status of storage enclosures, such as disk arrays, tape libraries, and other storage devices. The "send diagnostic" command is one of several commands defined by the SES/SMP protocols that enable administrators to collect information about the enclosure and diagnose any problems that may arise. When a "send diagnostic" command is issued, the enclosure or device performs a series of tests or checks to determine if it is operating correctly. The results of the test are reported back to the host system in the form of diagnostic data, which can be used to identify any issues that may require further investigation or repair. In an embodiment, support is provided in the "send diagnostic" to set the "expander_only" flag at a start of the upgrade and clear the flag once the upgrade has completed.

Figure 11:
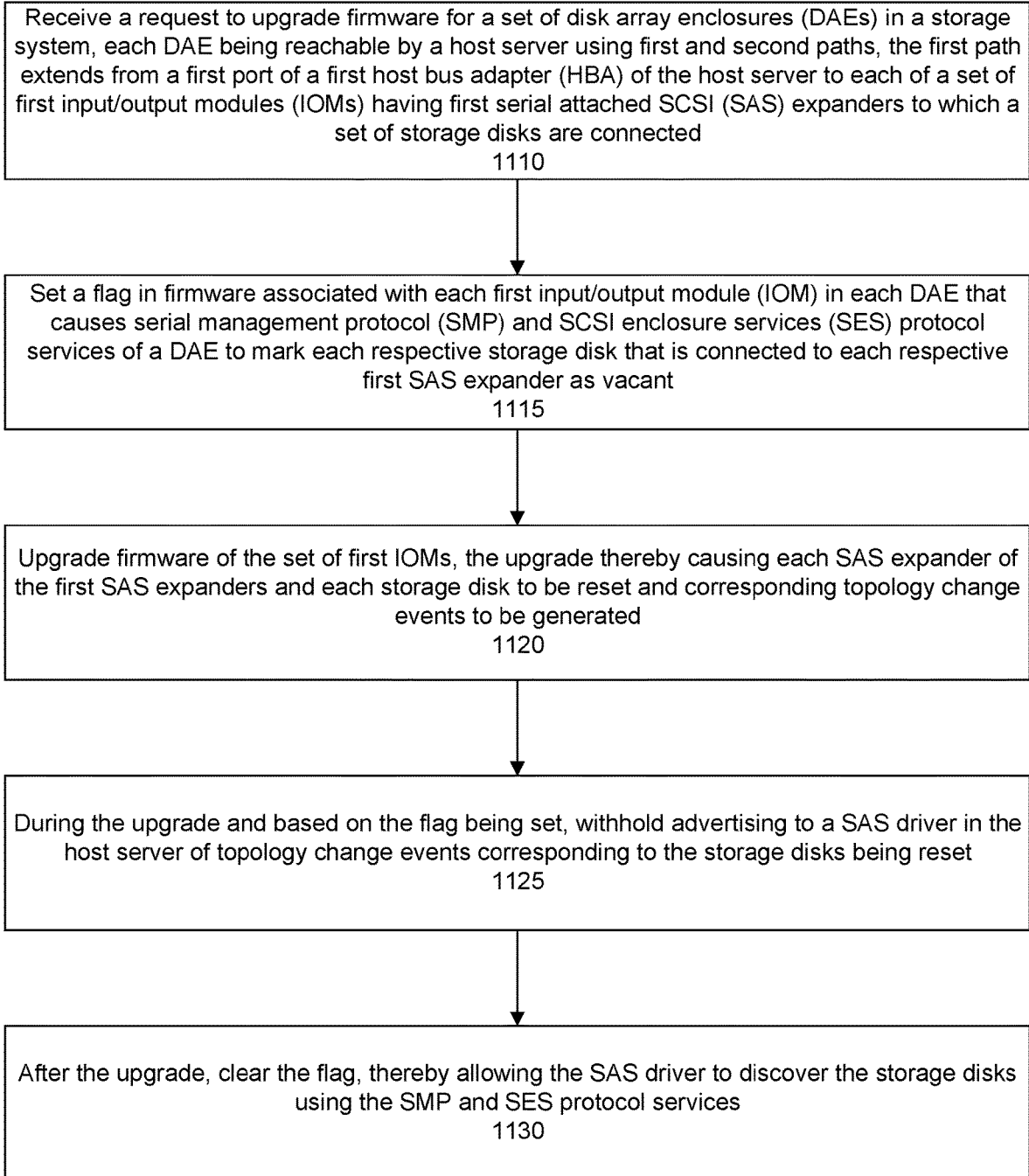
FIG. 11 shows a flow for handling topology change events at a firmware-level in accordance with one or more embodiments.

FIG. 11 shows a flow of a DAE firmware-level technique to handle topology change notifications during a DAE firmware upgrade. In a step 1110, a request is received to upgrade firmware for a set of DAEs in a storage system. In an embodiment, each DAE is reachable by a host server using first and second paths. The first path extends from a first port of a first host bus adapter of the host server to each of a set of first IOMs having first SAS expanders to which a set of storage disks are connected.

In a step 1115, a flag (e.g., "expander_only" flag) is set in firmware associated with each first IOM in each DAE. The flag causes Serial Management Protocol (SMP) and SCSI Enclosure Services (SES) of a DAE to mark each respective storage disk that is connected to each respective first SAS expander as vacant or empty. As discussed, SES is a protocol that allows the enclosure to report its status, including the status of individual disk drives, power supplies, cooling fans, and other components. The SES protocol also supports enclosure management tasks, such as setting LED indicators, configuring the enclosure's temperature monitoring, and controlling the enclosure's power. This information can be retrieved by the host system through a SCSI command set and can be used to monitor the health and status of the enclosure and its components.

SMP is a protocol used for the management of SAS (Serial Attached SCSI) devices, including disk drives and enclosures. It allows the host system to discover and configure SAS devices, and provides a mechanism for managing the enclosure, including configuring and monitoring the status of individual components.

In a step 1120, after the flag has been set, firmware of the set of first IOMs undergoes an upgrade. As part of the upgrade process, each SAS expander of the first SAS expanders and each storage disk is reset and corresponding topology change events are generated.

In a step 1125, during the upgrade and based on the flag in the firmware being set, SMP and SES withhold advertising to a SAS driver in the host server topology change events corresponding to the storage disks being reset. The firmware of a DAE typically handles SMP requests from the host system and responds with information about the SAS topology of the enclosure, including information about connected SAS devices, and the status of the SAS connections. During a firmware upgrade, the flag that has been set causes topology change events concerning the storage disks to be suppressed or withheld from being reported to the host server (e.g., OS kernel or driver). For example, if the host server conducts a discovery or otherwise issues SCSI commands concerning the storage disks to the DAEs during the upgrade, SMP and SES will not report the topology change events of the storage disks based on the flag set in the firmware. SMP and SES rely on firmware of the DAE is handle requests from the host server and communications to the host server.

In a step 1130, after the DAE firmware upgrade, the flag is cleared thereby allowing the host server including SAS driver to discover the storage disks using the SMP and SES protocols.

In an embodiment, a method includes: receiving a request to upgrade firmware for a plurality of disk array enclosures (DAEs) in a storage system, wherein each DAE is chained to another DAE by first and second chains, the first chain provides an active path from a first port of a first host bus adapter (HBA) of a host server to the storage system, and the second chain provides a secondary path from a second port of a second HBA of the host server to the storage system; determining whether the secondary path is operational; if the secondary path is operational, failing over data of the active path to the secondary path, the active path now being an inactive path; and upgrading firmware of the DAEs along the inactive path; and if the secondary path is not operational, denying the request to upgrade the firmware.

The method may further include: during the upgrading the firmware, ignoring at least some events generated to indicate changes in a topology of the storage system; and after the upgrading the firmware, processing a last event indicating changes in the topology, the last event thereby indicating a final state of the topology of the storage system.

In an embodiment, the upgrading of the firmware causes storage disks of the DAEs to restart multiple times thereby generating events for the restarts of each storage disk, and the method further comprises: during the upgrading, not reporting the events.

In an embodiment, the active path comprises a plurality of first input/output modules (IOMs) having first serial attached SCSI (SAS) expanders to which a plurality of storage disks are connected, the secondary path comprises a plurality of second IOMs having second SAS expanders to which the plurality of storage disks are connected, and each DAE comprises an IOM from the plurality of first IOMs and an IOM from the plurality of second IOMs.

In an embodiment, the active path comprises a plurality of first input/output modules (IOMs) having first serial attached SCSI (SAS) expanders to which a plurality of storage disks are connected, the secondary path comprises a plurality of second IOMs having second SAS expanders to which the plurality of storage disks are connected, and each DAE comprises a first IOM of the plurality of first IOMs and a second IOM of the plurality of second IOMs, and the method further comprises: when the secondary path is operational and after the failing over data of the active path to the secondary path, upgrading firmware of the plurality of first IOMs having the first SAS expanders to which the plurality of storage disks are connected, the upgrading thereby causing each of the first SAS expanders and each of the storage disks to reset; and during the upgrading firmware of the plurality of first IOMs, withholding reporting to an operating system of the host server events indicating that the storage disks have been reset.

In another embodiment, there is a method including: receiving a request to upgrade firmware for a plurality of disk array enclosures (DAEs) in a storage system, wherein each DAE is reachable by a host server using first and second paths, wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected, and the second path extends from a second port of a second HBA of the host server to each of a plurality of second IOMs in the DAEs, the plurality of second IOMs having second SAS expanders to which the plurality of storage disks are connected; changing the first port from a first state during which a SAS driver exposes all topology change events of the storage system to an operating system (OS) of the host server to a second state during which the SAS driver does not expose all of the topology change events to the OS; upgrading firmware of the plurality of first IOMs; and after the upgrading the firmware, changing the first port from the second state to the first state.

The method may further include: during the upgrading, receiving, by the SAS driver, a topology change event; checking that the first port is set to the second state; retrieving information from the topology change event to identify the topology change event as being one of a SAS expander of the first SAS expanders being added, the SAS expander of the first SAS expanders being removed, a storage disk being added, or the storage disk being removed; when the topology change event comprises the SAS expander being added or removed, advertising the topology change event to the OS and adding the topology change event to a firmware list; and when the topology change event comprises the storage disk being added or removed, not advertising the topology change event to the OS.

In an embodiment, the firmware list comprises a first in/first out (FIFO) list comprising a head and a tail, and the method further comprises: after the upgrading the firmware, reversing topology change events added to the firmware list during the upgrading so that a latest topology change event is at the head and an oldest topology change event is at the tail; and processing the topology change events recorded in the firmware list by: retrieving a topology change event from the firmware list; identifying a DAE specified in the retrieved topology change event; if the DAE identified in the retrieved topology change event has not been flagged as visited, flagging the DAE as having been visited, processing a storage disk add event or a storage disk remove event as recorded in the retrieved topology change event, and retrieving a next topology change event from the firmware list for processing; and if the DAE identified in the retrieved topology change event has been flagged as visited, retrieving the next topology change event from the firmware list for processing.

The method may further include: during the upgrading, receiving, by the SAS driver, a topology change event; and adding the topology change event to a firmware list when the topology change event concerns a SAS expander of the first SAS expanders being added or removed; and after the upgrading the firmware, retrieving, in reverse chronological order, a topology change event from the firmware list, the topology change event identifying a DAE and indicating whether a storage disk associated with the DAE has been added or removed; if the DAE has not been flagged as visited, flagging the DAE as having been visited and processing the topology change event; and if the DAE has been flagged as visited, not processing the topology change event.

The method may further include: during the upgrading, ignoring, by the SAS driver, topology change events indicating that a storage disk has been added or that a storage disk has been removed.

In an embodiment, the topology change events exposed by the SAS driver to the OS comprise events indicating that a SAS expander of the first SAS expanders has been added or removed, and the topology change events not exposed by the SAS driver to the OS comprise events indicating that a storage disk has been added or removed.

In another embodiment, there is a method including: receiving a request to upgrade firmware for a plurality of disk array enclosures (DAEs) in a storage system, wherein each DAE is reachable by a host server using first and second paths, wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected; setting a flag in firmware of each IOM of the plurality of first IOMs in each DAE that causes SAS management protocol (SMP) and SCSI enclosure services (SES) protocol services of a DAE to mark each respective storage disk connected to each respective SAS expander of the plurality of first SAS expanders as vacant; upgrading the firmware of the plurality of first IOMs, the upgrading thereby causing each SAS expander of the first SAS expanders and each storage disk of the plurality of storage disks to be reset and corresponding topology change events to be generated; and during the upgrading and based on the flag that has been set, withholding advertising to a SAS driver in the host server of topology change events indicating that a storage disk of the plurality of storage disks has been added or removed.

The method may further include: after the upgrading, clearing the flag, thereby allowing the SAS driver to discover the plurality of storage disks using the SMP and SES protocol services.

In an embodiment, the second path extends from a second port of a second HBA of the host server to each of a plurality of second IOMs in the DAEs, the plurality of second IOMs having second SAS expanders to which the plurality of storage disks are connected.

The SAS driver may be provided by a third party. The firmware may reside in a level below a level of the SAS driver. The SAS driver may reside at a kernel-level and the firmware may be outside the kernel-level.

In another embodiment, there is a system comprising: a processor; and memory configured to store one or more sequences of instructions which, when executed by the processor, cause the processor to carry out the steps of: receiving a request to upgrade firmware for a plurality of disk array enclosures (DAEs) in a storage system, wherein each DAE is chained to another DAE by first and second chains, the first chain provides an active path from a first port of a first host bus adapter (HBA) of a host server to the storage system, and the second chain provides a secondary path from a second port of a second HBA of the host server to the storage system; determining whether the secondary path is operational; if the secondary path is operational, failing over data of the active path to the secondary path, the active path now being an inactive path; and upgrading firmware of the DAEs along the inactive path; and if the secondary path is not operational, denying the request to upgrade the firmware.

In another embodiment, there is a computer program product, comprising a non-transitory computer-readable medium having a computer-readable program code embodied therein, the computer-readable program code adapted to be executed by one or more processors to implement a method comprising: receiving a request to upgrade firmware for a plurality of disk array enclosures (DAEs) in a storage system, wherein each DAE is chained to another DAE by first and second chains, the first chain provides an active path from a first port of a first host bus adapter (HBA) of a host server to the storage system, and the second chain provides a secondary path from a second port of a second HBA of the host server to the storage system; determining whether the secondary path is operational; if the secondary path is operational, failing over data of the active path to the secondary path, the active path now being an inactive path; and upgrading firmware of the DAEs along the inactive path; and if the secondary path is not operational, denying the request to upgrade the firmware.

In another embodiment, there is a system comprising: a processor; and memory configured to store one or more sequences of instructions which, when executed by the processor, cause the processor to carry out the steps of: receiving a request to upgrade firmware for a plurality of disk array enclosures (DAEs) in a storage system, wherein each DAE is reachable by a host server using first and second paths, wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected, and the second path extends from a second port of a second HBA of the host server to each of a plurality of second IOMs in the DAEs, the plurality of second IOMs having second SAS expanders to which the plurality of storage disks are connected; changing the first port from a first state during which a SAS driver exposes all topology change events of the storage system to an operating system (OS) of the host server to a second state during which the SAS driver does not expose all of the topology change events to the OS; upgrading firmware of the plurality of first IOMs; and after the upgrading the firmware, changing the first port from the second state to the first state.

In another embodiment, there is a computer program product, comprising a non-transitory computer-readable medium having a computer-readable program code embodied therein, the computer-readable program code adapted to be executed by one or more processors to implement a method comprising: receiving a request to upgrade firmware for a plurality of disk array enclosures (DAEs) in a storage system, wherein each DAE is reachable by a host server using first and second paths, wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected, and the second path extends from a second port of a second HBA of the host server to each of a plurality of second IOMs in the DAEs, the plurality of second IOMs having second SAS expanders to which the plurality of storage disks are connected; changing the first port from a first state during which a SAS driver exposes all topology change events of the storage system to an operating system (OS) of the host server to a second state during which the SAS driver does not expose all of the topology change events to the OS; upgrading firmware of the plurality of first IOMs; and after the upgrading the firmware, changing the first port from the second state to the first state.

In another embodiment, there is a system comprising: a processor; and memory configured to store one or more sequences of instructions which, when executed by the processor, cause the processor to carry out the steps of: receiving a request to upgrade firmware for a plurality of disk array enclosures (DAEs) in a storage system, wherein each DAE is reachable by a host server using first and second paths, wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected; setting a flag in firmware of each IOM of the plurality of first IOMs in each DAE that causes SAS management protocol (SMP) and SCSI enclosure services (SES) protocol services of a DAE to mark each respective storage disk connected to each respective SAS expander of the plurality of first SAS expanders as vacant; upgrading the firmware of the plurality of first IOMs, the upgrading thereby causing each SAS expander of the first SAS expanders and each storage disk of the plurality of storage disks to be reset and corresponding topology change events to be generated; and during the upgrading and based on the flag that has been set, withholding advertising to a SAS driver in the host server of topology change events indicating that a storage disk of the plurality of storage disks has been added or removed.

In another embodiment, there is a computer program product, comprising a non-transitory computer-readable medium having a computer-readable program code embodied therein, the computer-readable program code adapted to be executed by one or more processors to implement a method comprising: receiving a request to upgrade firmware for a plurality of disk array enclosures (DAEs) in a storage system, wherein each DAE is reachable by a host server using first and second paths, wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected; setting a flag in firmware of each IOM of the plurality of first IOMs in each DAE that causes SAS management protocol (SMP) and SCSI enclosure services (SES) protocol services of a DAE to mark each respective storage disk connected to each respective SAS expander of the plurality of first SAS expanders as vacant; upgrading the firmware of the plurality of first IOMs, the upgrading thereby causing each SAS expander of the first SAS expanders and each storage disk of the plurality of storage disks to be reset and corresponding topology change events to be generated; and during the upgrading and based on the flag that has been set, withholding advertising to a SAS driver in the host server of topology change events indicating that a storage disk of the plurality of storage disks has been added or removed.

Figure 12:
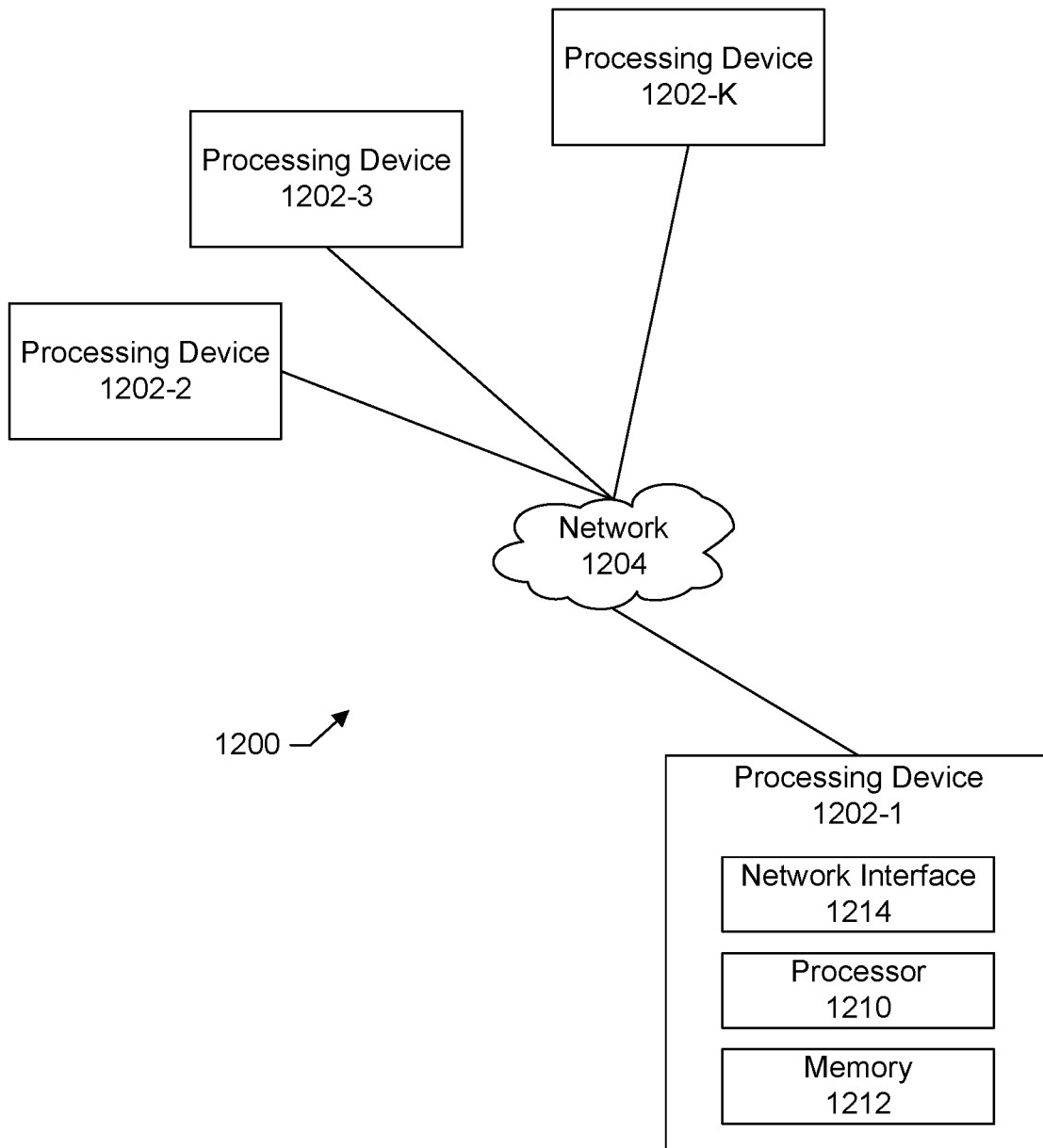
FIG. 12 shows a block diagram of a processing platform that may be utilized to implement at least a portion of an information processing system, according to one or more embodiments.

FIG. 12 shows an example of a processing platform 1200. The processing platform 1200 in this embodiment comprises a portion of system 100 and includes a plurality of processing devices, denoted 1202-1, 1202-2, 1202-3 . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 1200 are illustratively implemented in the form of software running on one or more processing devices.

FIG. 13 shows a system block diagram of a computer system 1305 used to execute the software of the present system described herein. The computer system includes a monitor 1307, keyboard 1315, and mass storage devices 1320. Computer system 1305 further includes subsystems such as central processor 1325, system memory 1330, input/output (I/O) controller 1335, display adapter 1340, serial or universal serial bus (USB) port 1345, network interface 1350, and speaker 1355. The system may also be used with computer systems with additional or fewer subsystems. For example, a computer system could include more than one processor 1325 (i.e., a multiprocessor system) or a system may include a cache memory.

Arrows such as 1360 represent the system bus architecture of computer system 1305. However, these arrows are illustrative of any interconnection scheme serving to link the subsystems. For example, speaker 1355 could be connected to the other subsystems through a port or have an internal direct connection to central processor 1325. The processor may include multiple processors or a multicore processor, which may permit parallel processing of information. Computer system 1305 shown in FIG. 13 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11c, 802.11g. 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    receiving a request to upgrade firmware for a plurality of disk array enclosures (DAEs) in a storage system, wherein each DAE is reachable by a host server using first and second paths,
    wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected, and
    the second path extends from a second port of a second HBA of the host server to each of a plurality of second IOMs in the DAEs, the plurality of second IOMs having second SAS expanders to which the plurality of storage disks are connected;
    changing the first port from a first state during which a SAS driver exposes all topology change events of the storage system to an operating system (OS) of the host server to a second state during which the SAS driver does not expose all of the topology change events to the OS;
    upgrading firmware of the plurality of first IOMs; and
    after the upgrading the firmware, changing the first port from the second state to the first state.

2. The method of claim 1 further comprising:
    during the upgrading,
        receiving, by the SAS driver, a topology change event;
        checking that the first port is set to the second state;
        retrieving information from the topology change event to identify the topology change event as being one of a SAS expander of the first SAS expanders being added, the SAS expander of the first SAS expanders being removed, a storage disk being added, or the storage disk being removed;
        when the topology change event comprises the SAS expander being added or removed, advertising the topology change event to the OS and adding the topology change event to a firmware list; and
        when the topology change event comprises the storage disk being added or removed, not advertising the topology change event to the OS.

3. The method of claim 2 wherein the firmware list comprises a first in/first out (FIFO) list comprising a head and a tail, and the method further comprises:
    after the upgrading the firmware, reversing topology change events added to the firmware list during the upgrading so that a latest topology change event is at the head and an oldest topology change event is at the tail; and
    processing the topology change events recorded in the firmware list by:
        retrieving a topology change event from the firmware list;
        identifying a DAE specified in the retrieved topology change event;
        if the DAE identified in the retrieved topology change event has not been flagged as visited, flagging the DAE as having been visited, processing a storage disk add event or a storage disk remove event as recorded in the retrieved topology change event, and retrieving a next topology change event from the firmware list for processing; and
        if the DAE identified in the retrieved topology change event has been flagged as visited, retrieving the next topology change event from the firmware list for processing.

4. The method of claim 1 further comprising:
    during the upgrading,
        receiving, by the SAS driver, a topology change event; and
        adding the topology change event to a firmware list when the topology change event concerns a SAS expander of the first SAS expanders being added or removed; and
    after the upgrading the firmware,
        retrieving, in reverse chronological order, a topology change event from the firmware list, the topology change event identifying a DAE and indicating whether a storage disk associated with the DAE has been added or removed;
        if the DAE has not been flagged as visited, flagging the DAE as having been visited and processing the topology change event; and
        if the DAE has been flagged as visited, not processing the topology change event.

5. The method of claim 1 further comprising:
    during the upgrading, ignoring, by the SAS driver, topology change events indicating that a storage disk has been added or that a storage disk has been removed.

6. The method of claim 1 wherein the topology change events exposed by the SAS driver to the OS comprise events indicating that a SAS expander of the first SAS expanders has been added or removed, and
    wherein the topology change events not exposed by the SAS driver to the OS comprise events indicating that a storage disk has been added or removed.

7. A system comprising: a processor; and memory configured to store one or more sequences of instructions which, when executed by the processor, cause the processor to carry out the steps of:
    receiving a request to upgrade firmware for a plurality of disk array enclosures (DAEs) in a storage system, wherein each DAE is reachable by a host server using first and second paths,
    wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected, and
    the second path extends from a second port of a second HBA of the host server to each of a plurality of second IOMs in the DAEs, the plurality of second IOMs having second SAS expanders to which the plurality of storage disks are connected;
    changing the first port from a first state during which a SAS driver exposes all topology change events of the storage system to an operating system (OS) of the host server to a second state during which the SAS driver does not expose all of the topology change events to the OS;
    upgrading firmware of the plurality of first IOMs; and
    after the upgrading the firmware, changing the first port from the second state to the first state.

8. The system of claim 7 wherein the processor further carries out the steps of:
during the upgrading,
receiving, by the SAS driver, a topology change event;
checking that the first port is set to the second state;
retrieving information from the topology change event to identify the topology change event as being one of a SAS expander of the first SAS expanders being added, the SAS expander of the first SAS expanders being removed, a storage disk being added, or the storage disk being removed;
when the topology change event comprises the SAS expander being added or removed, advertising the topology change event to the OS and adding the topology change event to a firmware list; and
when the topology change event comprises the storage disk being added or removed, not advertising the topology change event to the OS.

9. The system of claim 8 wherein the firmware list comprises a first in/first out (FIFO) list comprising a head and a tail, and the processor further carries out the steps of:
after the upgrading the firmware, reversing topology change events added to the firmware list during the upgrading so that a latest topology change event is at the head and an oldest topology change event is at the tail; and
processing the topology change events recorded in the firmware list by:
retrieving a topology change event from the firmware list;
identifying a DAE specified in the retrieved topology change event;
if the DAE identified in the retrieved topology change event has not been flagged as visited, flagging the DAE as having been visited, processing a storage disk add event or a storage disk remove event as recorded in the retrieved topology change event, and retrieving a next topology change event from the firmware list for processing; and
if the DAE identified in the retrieved topology change event has been flagged as visited, retrieving the next topology change event from the firmware list for processing.

10. The system of claim 7 wherein the processor further carries out the steps of:
during the upgrading,
receiving, by the SAS driver, a topology change event; and
adding the topology change event to a firmware list when the topology change event concerns a SAS expander of the first SAS expanders being added or removed; and
after the upgrading the firmware,
retrieving, in reverse chronological order, a topology change event from the firmware list, the topology change event identifying a DAE and indicating whether a storage disk associated with the DAE has been added or removed;
if the DAE has not been flagged as visited, flagging the DAE as having been visited and processing the topology change event; and
if the DAE has been flagged as visited, not processing the topology change event.

11. The system of claim 7 wherein the processor further carries out the steps of:

during the upgrading, ignoring, by the SAS driver, topology change events indicating that a storage disk has been added or that a storage disk has been removed.

12. The system of claim 7 wherein the topology change events exposed by the SAS driver to the OS comprise events indicating that a SAS expander of the first SAS expanders has been added or removed, and
wherein the topology change events not exposed by the SAS driver to the OS comprise events indicating that a storage disk has been added or removed.

13. A computer program product, comprising a non-transitory computer-readable medium having a computer-readable program code embodied therein, the computer-readable program code adapted to be executed by one or more processors to implement a method comprising:
receiving a request to upgrade firmware for a plurality of disk array enclosures (DAEs) in a storage system, wherein each DAE is reachable by a host server using first and second paths,
wherein the first path extends from a first port of a first host bus adapter (HBA) of the host server to each of a plurality of first input/output modules (IOMs) in the DAEs, the plurality of first IOMs having first serial attached SCSI (SAS) expanders to which a plurality of storage disks are connected, and
the second path extends from a second port of a second HBA of the host server to each of a plurality of second IOMs in the DAEs, the plurality of second IOMs having second SAS expanders to which the plurality of storage disks are connected;
changing the first port from a first state during which a SAS driver exposes all topology change events of the storage system to an operating system (OS) of the host server to a second state during which the SAS driver does not expose all of the topology change events to the OS;
upgrading firmware of the plurality of first IOMs; and
after the upgrading the firmware, changing the first port from the second state to the first state.

14. The computer program product of claim 13 wherein the method further comprises:
during the upgrading,
receiving, by the SAS driver, a topology change event;
checking that the first port is set to the second state;
retrieving information from the topology change event to identify the topology change event as being one of a SAS expander of the first SAS expanders being added, the SAS expander of the first SAS expanders being removed, a storage disk being added, or the storage disk being removed;
when the topology change event comprises the SAS expander being added or removed, advertising the topology change event to the OS and adding the topology change event to a firmware list; and
when the topology change event comprises the storage disk being added or removed, not advertising the topology change event to the OS.

15. The computer program product of claim 14 wherein the firmware list comprises a first in/first out (FIFO) list comprising a head and a tail, and the method further comprises:
after the upgrading the firmware, reversing topology change events added to the firmware list during the upgrading so that a latest topology change event is at the head and an oldest topology change event is at the tail; and processing the topology change events recorded in the firmware list by:
    retrieving a topology change event from the firmware list;
    identifying a DAE specified in the retrieved topology change event;
    if the DAE identified in the retrieved topology change event has not been flagged as visited, flagging the DAE as having been visited, processing a storage disk add event or a storage disk remove event as recorded in the retrieved topology change event, and retrieving a next topology change event from the firmware list for processing; and
    if the DAE identified in the retrieved topology change event has been flagged as visited, retrieving the next topology change event from the firmware list for processing.

16. The computer program product of claim 13 wherein the method further comprises:
    during the upgrading,
        receiving, by the SAS driver, a topology change event; and
        adding the topology change event to a firmware list when the topology change event concerns a SAS expander of the first SAS expanders being added or removed; and
    after the upgrading the firmware,
        retrieving, in reverse chronological order, a topology change event from the firmware list, the topology change event identifying a DAE and indicating whether a storage disk associated with the DAE has been added or removed;
        if the DAE has not been flagged as visited, flagging the DAE as having been visited and processing the topology change event; and
        if the DAE has been flagged as visited, not processing the topology change event.

17. The computer program product of claim 13 wherein the method further comprises:
    during the upgrading, ignoring, by the SAS driver, topology change events indicating that a storage disk has been added or that a storage disk has been removed.

18. The computer program product of claim 13 wherein the topology change events exposed by the SAS driver to the OS comprise events indicating that a SAS expander of the first SAS expanders has been added or removed, and
    wherein the topology change events not exposed by the SAS driver to the OS comprise events indicating that a storage disk has been added or removed.

* * * * *